United States Patent [19]

Lam et al.

[11] Patent Number: 4,918,534

[45] Date of Patent: Apr. 17, 1990

[54] OPTICAL IMAGE PROCESSING METHOD AND SYSTEM TO PERFORM UNSHARP MASKING ON IMAGES DETECTED BY AN I.I./TV SYSTEM

[75] Inventors: Kwok L. Lam; Heang-Ping Chan, both of Chicago; Kunio Doi, Willowbrook, all of Ill.; Kenichi Komatsu; Michitaka Honda, both of Tochigi, Japan

[73] Assignees: The University of Chicago, Chicago, Ill.; Kabushiki Kaisha Toshiba, Kawasaki, Japan

[21] Appl. No.: 184,791

[22] Filed: Apr. 22, 1988

[51] Int. Cl.[4] .......................... H04N 3/15; H04N 7/18
[52] U.S. Cl. ..................................... 358/225; 358/101; 358/168; 358/213.13; 378/99
[58] Field of Search ................. 358/166, 101, 168, 93, 358/140, 225, 213.13, 213.26; 364/414; 378/99

[56] References Cited

U.S. PATENT DOCUMENTS

| | | | |
|---|---|---|---|
| 4,388,646 | 6/1983 | Strother | 358/166 |
| 4,453,181 | 6/1984 | Munakata | 358/166 |
| 4,546,248 | 10/1985 | Craig | 358/168 |
| 4,652,916 | 3/1987 | Suzaki | 358/93 |

OTHER PUBLICATIONS

J. A. Sorenson et al., Invest. Radiol. 16, 281 (1981).
W. W. Peppler et al., Presented at the Chest Imaging Conference-87, Madison, Wisconsin, 1987.

*Primary Examiner*—Tommy P. Chin
*Attorney, Agent, or Firm*—Oblon, Spivak, McClelland, Maier & Neustadt

[57] ABSTRACT

An optical image processing method and system in a radiographic system, wherein an image of an object is produced by an image intensifier and converted to video signal by a television (TV) camera system. A liquid crystal display (LCD) is placed bewteen the image intensifier and the T.V. camera system at a location shifted from a focal plane of the T.V. camera system. The liquid crystal display defines plural pixels which are controllable so that light produced by the image intensifier and impinging on the plural LCD pixels can be selectively attenuated by application of selected control signals to the LCD. Control signals are generated selectively based on predetermined parameters of the radiographic system and the image. These control signals are applied to the LCD to perform selective attenuation and corresponding dynamic range compression of light passing through respective LCD pixels, thereby to perform unsharp masking of the image produced by the image intensifier using the LCD.

20 Claims, 25 Drawing Sheets

OPTICAL IMAGE PROCESSING METHOD AND SYSTEM TO PERFORM UNSHARP MASKING ON IMAGES DETECTED BY AN I.I./TV SYSTEM

BACKGROUND OF THE INVENTION

1. Field of the Invention

This invention relates to a method and system for performing real-time optical image processing in an image intensifier/television radiographic medical imaging system.

2. Discussion of Background

Typical image intensifier/television (II-TV) systems have a dynamic range of about 1000, which is determined mainly by the TV camera. Within this dynamic range, the signal-to-noise ratio (SNR) varies greatly. At the lower end of the range, the SNR approaches 1:1, and at the higher end it is about 1000:1 for typical TV cameras. Thus, it is advantageous to compress the dynamic range of the image incident on the TV camera and to maintain the signal from the II-TV system near the maximum video level. This is especially important for images having a wide dynamic range or low quantum noise.

Various methods have been introduced for compression of the dynamic range of x-ray images of the thorax. (See, for example J. A. Sorenson, et al., Invest. Radiol. 16, 281 (1981); D. B. Plewes, Med. Phy. 10, 646 (1983); and B. H. Hasegawa, et al., Radiology 159, 537 (1986).) However, these methods are relatively slow and thus are not suitable for dynamic imaging with II-TV systems.

Another group (W. W. Peppler, et al., presented at the Chest Imaging Conference-87, Madison, Wis., 1987), working on a dynamic-range compression method for II-TV systems has reported a technique for producing equalized chest radiographs using an optical beam attenuator which equalizes the light field reaching the TV camera. The optical beam attenuator used was a spatially addressable liquid crystal display (LCD) device which was loaded with a gray-scale transformation of the digitized camera output. It was reported that the benefits of the optical beam attenuator included a potential increase in system DQE (at high dose rates), bit compression, reduced saturation effects and display advantages, as well as the capability of operating at video rates. It was further reported that the optical beam attenuator was capable of reducing dynamic range by a factor of 6.8, but would probably require an additional stage of light amplification.

SUMMARY OF THE INVENTION

Accordingly, one object of this invention is to provide a new and improved optical image processing method and system which is relatively simple to implement and which make full use of the signal-to-noise ratio (SNR) of the available x-ray quanta in an II-TV radiographic medical image system.

Another object of this invention is to provide an optical image processing method and system as above-noted, which compresses the dynamic range of a radiographic medical image produced by an II and improves the SNR of images acquired by the TV cameras.

These and other objects are achieved according to the invention by providing a novel optical image processing method and system for compressing the dynamic range and improving the SNR of images detected by an II-TV system, wherein a liquid-crystal display (LCD) is placed between the II and TV camera to perform real-time optical sharp masking. Although the method and system of the invention does not reduce the x-ray quantum noise in poorly penetrated region, as do other methods that manipulate the x-ray beam, it is relatively simple and can be designed to make full use of the SNR of the available x-ray quanta.

As described hereinafter, the basic physical properties of the LCD and the feasibility of performing optical image processing (OIP) by using the LCD to compress the dynamic range and to improve the SNR of images acquired by TV cameras are investigated and demonstrated; specific embodiments are also described.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The response of an II is linear over a very wide range of incident x-ray intensities, which typically span more than six orders of magnitude. Therefore, the dynamic range of any medical x-ray image can easily be accommodated by the II. The present invention performs image processing just before the TV camera in order to avoid the difficulty of manipulating the incident x-ray distribution. The basic principle of OIP is similar to the photographic unsharp masking technique described by Sorenson et al., above noted.

Figure 1:
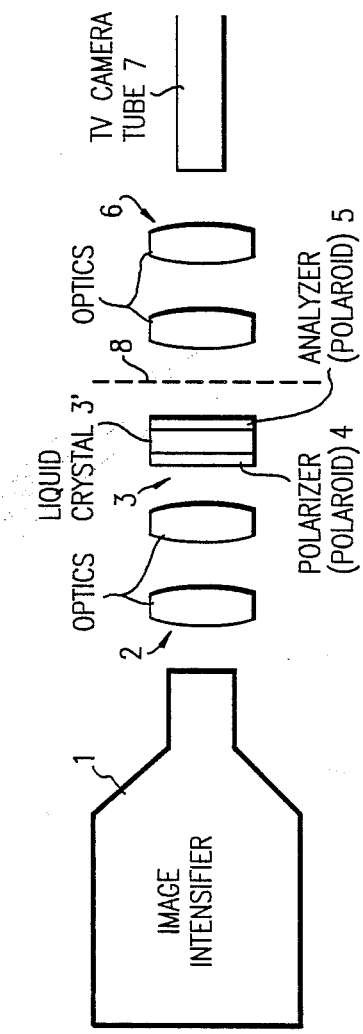
FIG. 1 is a schematic diagram of an II-TV x-ray imaging system in which a liquid-crystal display (LCD) is used for optical image processing (OIP)

Referring now to the drawings, wherein like reference numerals designate identical or corresponding parts throughout the several views, and more particularly to FIG. 1 thereof, there is shown a schematic diagram of the arrangement of several key components of the present invention, including an image intensifier (II) 1, optical focusing members 2, liquid crystal display (LCD) 3 having front and rear polaroids 4 and 5, respectively called the polarizer and analyzer, sandwiching a layer of liquid crystal 3', optical focusing members 6 and TV camera tube 7. The image from the output phosphor of the II 1 is intercepted by the LCD 3, the polarizer 4 of which polarizes the incident visible light. The liquid crystal 3' modifies the polarization so that the analyzer 5 absorbs part of the transmitted light. The polarization, and therefore the absorption, depends on the electric field in the liquid crystal 3', which can be varied by transparent electrodes on the LCD 3. There is a transparent electrode for each pixel of the LCD 3, and thus the transmission of each pixel can be controlled individually so that brighter parts of the image from the output phosphor are absorbed more by the LCD and the dynamic range of the image detected by the TV camera is reduced. By proper displacement of the LCD from the focal plane 8, the image displayed on the LCD 3 acts as a blurred mask of the image from the II output phosphor, thereby producing an effect similar to unsharp masking of the transmitted image.

The following is a discussion of the theoretical basis of the invention, including factors related to compression of dynamic range, matching of signal-to-noise ratios (SNRs) and experimentation to verify the feasibility of the invention. Thereafter is provided a description of various embodiments by which the invention may be utilized.

THEORY

The dynamic range of an image can be described by its contrast ratio (C), which is defined as the ratio of the highest to the lowest luminence within the image. The contrast ratio (C'') of an LCD 3 is the ratio of maximum to minimum transmission, since higher transmission results in higher luminence when the LCD 3 is uniformly illuminated. In the optical image processing OIP system, the LCD 3 processes the original image from the output phosphor of the II 1 and produces a processed image on the target of the TV camera 7. Let the optical system transform the coordinates (x,y) on the output phosphor to (m''x,m''y) on the LCD 3 and to (m'x,m'y) on the TV camera target, where m' and m'' are the magnifications of the optical system. The luminence of the processed image on the TV camera target, $L'(m'x,m'y)$, is given by $$L'(m'x,m'y) = a\, L(x,y)\, T(m''x,m''y), \tag{1}$$

where $L(x,y)$ is the luminence of the image on the output phosphor, $T(m''x,m''y)$ is the transmission of the LCD 3, and a is a constant. To compress the dynamic range of the image, higher transmission is employed for regions with lower luminence; that is, $$\max[L'(m'x,m'y)] = a\, \max[L(x,y)]\min[T(m''x,m''y)] \tag{2}$$

$$\min[L'(m'x,m'y)] = a\, \min[L(x,y)]\max[T(m''x,m''y)]. \tag{3}$$

Therefore, the contrast ratio of the processed image, C', can be expressed as $$C' = C/C''. \tag{4}$$

Since C'' is greater than unity, C' is smaller than C. The contrast is reversed for the extreme case when C'' > C. Although the global contrast of the image is reduced by OIP, the local contrast, which corresponds to a higher spatial frequency, is not affected significantly because the image on the LCD is blurred.

Equation (4) relates the contrast ratio of the processed image to that of the original image. However, it does not specify the transfer characteristic between L and L'. By controlling the transmission of the LCD as a function of the luminence L according to the relationship:

$$T(m''x,m''y) = (b/a)\, L^{G''-1}(x,y), \tag{5}$$

where b and G'' are constants, we obtain $$L'(m'x,m'y) = b\, L^{G''}(x,y). \tag{6}$$

Equation (6) indicates that the gamma value of the transfer characteristic of the OIP system is given by G''. In analogy to the derivation of equation (4) from equation (1), it follows from equation (5) that $$C'' = C^{1-G''}$$

or $$G'' = 1 - (\log C''/\log C).$$

If the gamma of the light transfer characteristic of the TV camera is G' [i.e., $V(t) = k\, L'^{G'}(m'x,m'y)$, where k is a constant and V(t) is the video signal which varies with time t]then the overall gamma of the LCD-TV combination will be G″G′. By operating at an appropriate LCD contrast ratio C″, G″ [equation (7)] can be adjusted and the gamma of the LCD-TV tailored to suit the requirements of the imaging task and thus compress the dynamic range of the image.

Figure 2:
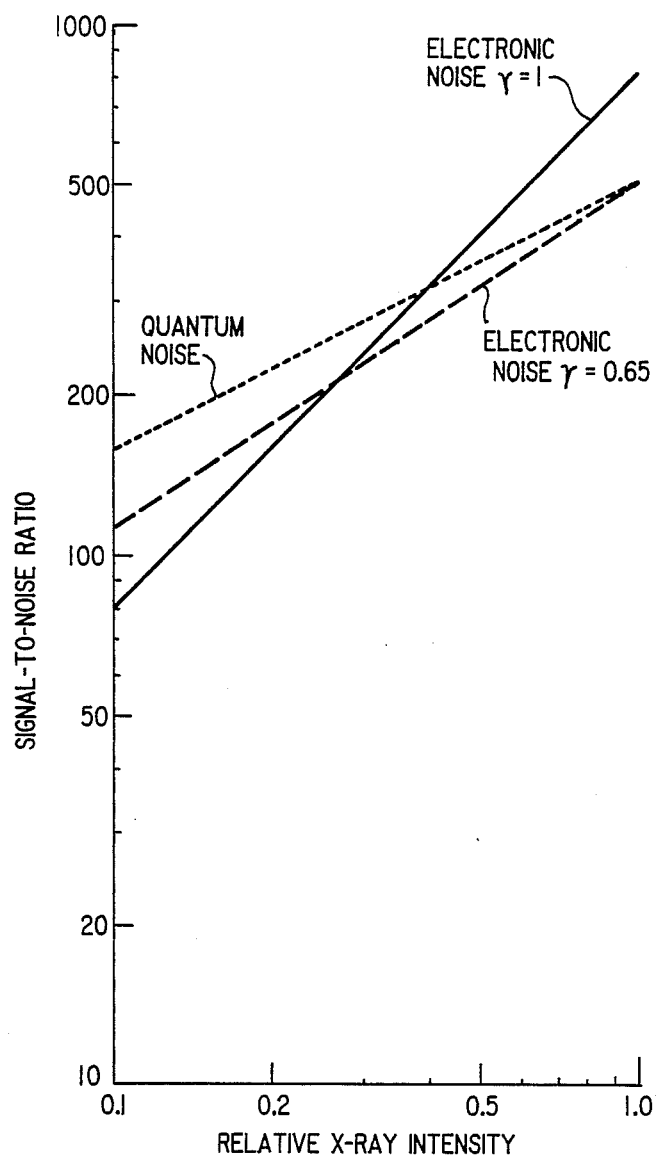
FIG. 2 is a graph illustrating the dependence of signal-to-noise ratio on x-ray intensity for quantum noise and for electronic noise of TV cameras with two different gamma values.

The control of gamma, before the optical image is detected by the TV camera, allows the LCD-TV system to have SNR characteristic matched to that of quantum noise. It is well known that the SNR of quantum noise is proportional to the square root of the luminance at the output phosphor, as shown in FIG. 2. The major noise source of a TV camera is electronic noise (V′), which is independent of the signal level. The SNR at the camera output is expressed in terms of the luminance on the output phosphor of the II as follows:

$$\frac{V(t)}{V'} = \left(\frac{kb^{G'}}{V'}\right) L^{G''G'}(x,y). \tag{8}$$

The SNRs for two values of G (G=0.65 and G′=1.0) without OIP (G″=1.0) are also plotted in FIG. 2. The value of G′ is 0.65 for TV camera tubes using antimony trisulfide. Other TV tubes such as the Plumbicon, Saticon, Newvicon, Chalicon, and tubes with a silicon-diode-array target, as well as solid-state devices such as the charge-coupled device (CCD), all have G′ values of unity. Thus, the curves for the SNR of the TV camera tubes are not parallel to that of quantum noise, and the difference is especially large for the tubes with G′=1. This implies that the ratio of electronic noise to quantum noise is not constant within an image that contains variations in x-ray intensity. In particular, the highest ratio occurs in a region with the lowest x-ray intensity. If the quantum noise is required to be the dominant noise component in the entire image, the TV camera has to provide high SNR even at the lowest-signal region and thus the SNR of the camera in the high-signal region will be more than adequate. This "mismatching" is especially significant in images with a wide dynamic range. The SNR for a TV camera tube with an antimony trisulfide target whose gamma value is 0.65 matches that of the quantum noise more closely. However, its SNR is lower than that of most other TV camera tubes at high illumination. This and other considerations, such as lag, make this type of tube undesirable for high-quality medical imaging. The approach followed according to the invention is to tailor the gamma G of the LCD-TV system so that its SNR dependence on luminance matches that of quantum noise. To provide the square-root dependence on luminance, as for quantum noise, according to the present invention G″ is selected such that G′G″ is in a range of 0.4 to 0.5 and preferably equals 0.5. Therefore, with an antimony trisulfide TV camera tube (G′=0.65), the LCD can be operated at an appropriate level of C″ such that G″=0.77, and for other TV camera tubes, such that G″=0.5. The SNR of the LCD-TV system will then be proportional to the square root of L, thus matching the property of quantum noise.

The inventors have performed experiments to explore the feasibility of using an LCD for dynamic-range compression and SNR improvement. Since OIP operates on visible light, an image on the output phosphor of an image intensifier II was simulated by using an image on film that is illuminated by a light table of a camera stand. In the first experiment, the physical properties of the LCD were studied. Then, based on the measured properties, an experiment was performed to study the basic properties of OIP with an LCD. Finally, OIP was applied to a magnified chest radiograph to demonstrate its effect on images containing anatomic structures.

Characteristics of LCD

The LCD employed was modified from a Casio TV-200 pocket television set. This LCD has 110×144 pixels and is capable of displaying sixteen discrete gray levels (i.e., the video signal digitized to 4 bits in the pocket TV). The circuit was modified so that the pocket TV could be driven with an RS-170 video signal directly. The video signal was DC-coupled to the video circuit, and manual black-level control was implemented. The brightness control voltage applied to the LCD was monitored so that the brightness could be set reproducibly. The experimental setup was shown in FIG. 3, except that the film, the lucite block, and the polarizing filter were removed for this experiment. The LCD was placed on the light table and was imaged by a COHU TV camera which had a Newvicon tube. A Nikkor 55 mm f/3.5 macro lens was attached to the TV camera with a C-mount adaptor. The lens was defocused slightly to bur the pixels of the LCD. For this experiment, the automatic black-level and automatic gain controls of the camera were disabled. The camera has electronic shading correction and was adjusted to provide optimal correction. The gamma control of the camera was set to the maximum. The vertical and horizontal synchronizations were driven by a Gould FD 5000 image processor, which also digitized the video signal from the camera to 8-bit precision with a 512×512 matrix. The image processor was interfaced to a DEC VAX 11/750 computer on which the pixel values after digitization were analyzed.

The analyzer 5 on the LCD was removed, cleaned, and then replaced without any adhesive so that it could be moved easily. It was found that the polarization direction of the analyzer was oriented at 45 degrees with respect to the TV lines, so that the polarization direction changed by 90 degrees when the analyzer was flipped. The characteristic curve of the LCD for both directions of polarization was measured.

The LCD was driven by a video signal from another Gould FD 5000 image processor. A computer-generated test pattern which had 9 areas of constant pixel values at the center of a uniform background was sent to the LCD. The size of each area was 32×32 pixels. The brightest area had a pixel value of 255, and the darkest area, a pixel value of 1. The other areas had pixel values evenly spaced between 1 and 255, and the background was adjusted so that the average pixel value of the test pattern was 128. The analyzer 5 was placed a few millimeters to the left, so that the right side of the LCD was not covered by the analyzer. The transmission of the LCD without the analyzer 5 was measured to be 43%. Since the liquid crystal modified the polarization without absorbing any light when it was driven, the pixel value of the uncovered region was used as a reference value for 43% transmission. The absolute transmission of other parts of the image was thus determined with the TV camera used as a video-densitometer. The aperture of the lens was fixed at f/4 throughout the experiment, and the brightness of the light table was set so that the brightest part of the image was close to the maximum video level. To compensate for the dark level of the camera-digitizer system, the image obtained when the light table was turned off was subtracted from the image obtained.

Characteristics of OIP

Figure 3:
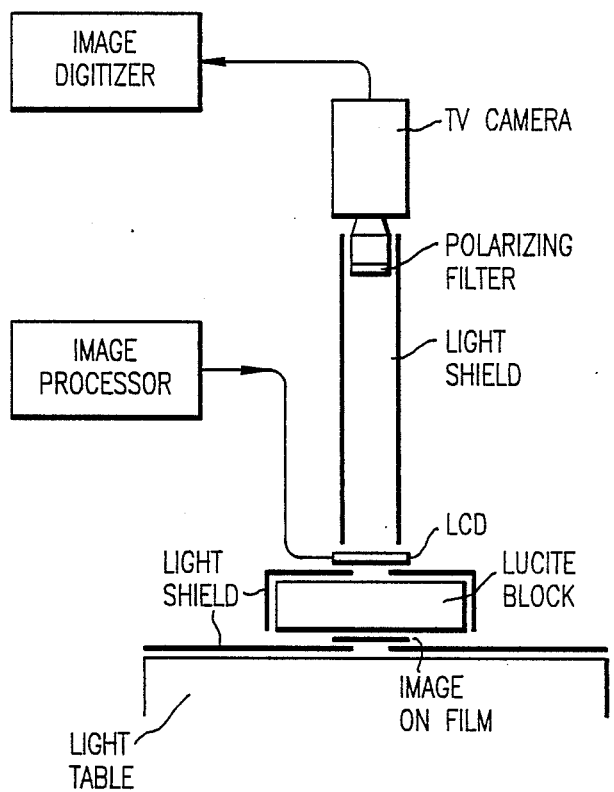
FIG. 3 is a schematic diagram of an experimental setup for simulation of OIP in an x-ray imaging system.

To study the characteristics of the OIP, a film strip obtained by exposing a film with a light sensitometer was employed. The optical density of each step was measured on a densitometer, and from this density the relative luminance of each step on the light table was calculated. The film strip was placed on the light table and imaged by the TV camera through the LCD 3, as shown in FIG. 3. The analyzer 5 on the LCD 3 was replaced by a polarizing filter attached to the camera lens. The TV camera was focused on the film strip, so that the image on the LCD was blurred optically.

To quantify the effect of OIP on the dynamic range and SNR, a baseline image was obtained by removing the LCD and adjusting the brightness of the light table to compensate for the transmission of the LCD 3. This was accomplished by maintaining the brightest step approximately at the maximum video level. Moreover, from the baseline image, the required transmission of each pixel was calculated according to equation (5) and the calculated mask image was displayed on the LCD 3. The distance between the LCD 3 and the camera was adjusted so that the image size of the film strip and the image size of the mask displayed on the LCD 3 were identical at the target of the TV camera. The position of the LCD 3 was then carefully adjusted so that the two TV images overlapped.

OIP of magnified chest radiograph

To simulate the effect of OIP on medical images, the film strip was replaced by a minified chest image, which was obtained by copying a full-size chest radiograph onto a 35 mm slide. The maximum optical density of the slide was 0.97 in the lung field, and the minimum was 0.23 at the mediastinum. The dynamic range of the minified chest image was thus 5.6. By using a procedure similar to that for the baseline image as above described, an image of the slide without the LCD was obtained and the required transmission of the pixels on the LCD was calculated. The image with OIP was then acquired with the calculated mask image displayed on the LCD. To demonstrate the compression of the dynamic range, the light intensity of the table was adjusted so that the video signals in the lung field were identical with and without OIP.

RESULTS (a) Characteristics of LCD

Figure 4A:
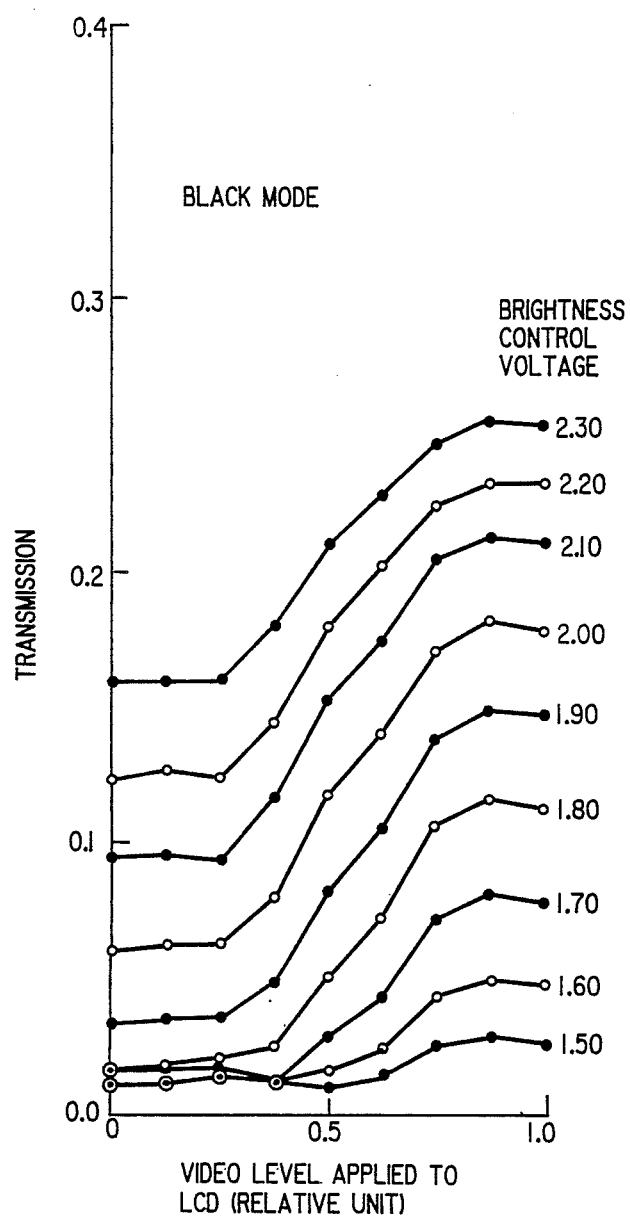
FIGS. 4a and 4b are graphs illustrating the dependence of transmission of the LCD on the video level applied to the LCD in a black mode and a white mode, respectively.
Figure 4B:
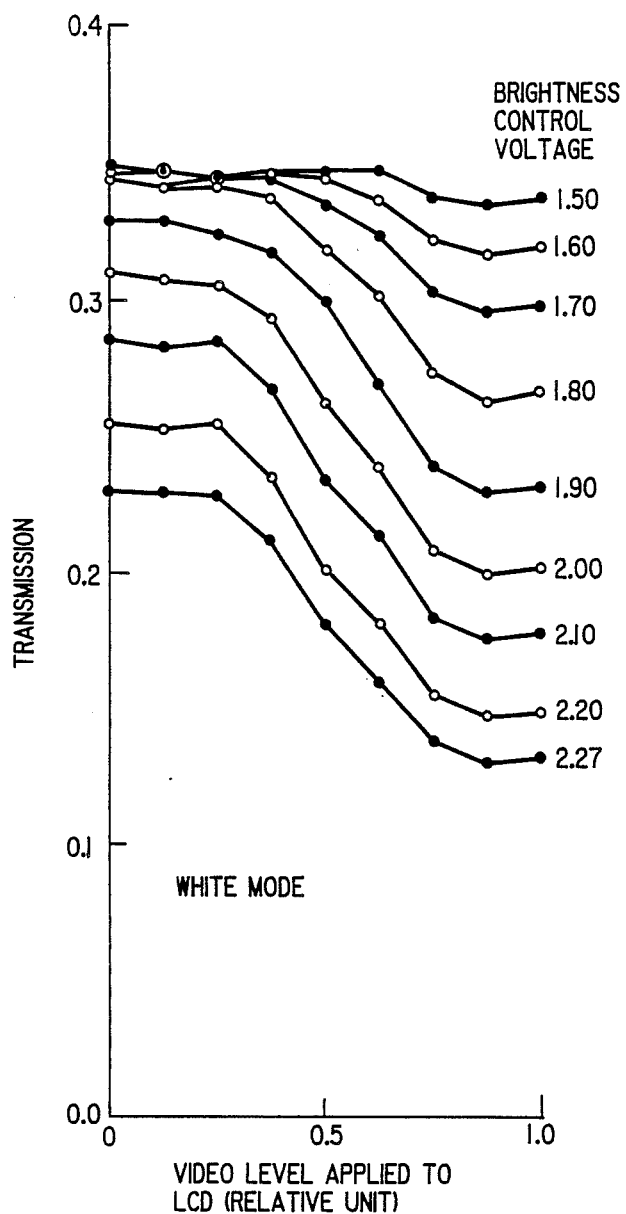

The LCD can be operated in two different modes, depending on the alignment of the analyzer in the polarizer/analyzer pair. When the analyzer is oriented such that the transmission through an unpowered LCD is minimum, the mode is referred to as the black mode. When the analyzer is rotated 90 degrees from its orientation in the black mode, the transmission through the unpowered LCD is maximum and is referred to as the white mode. The transmission of the LCD at different driving video levels was measured for different brightness settings on the pocket TV. The result for the black mode is shown in FIG. 4a, and that for the white mode is shown in FIG. 4b. The family of transmission curves saturated at both high and low video levels, indicating that the range of video levels employed in the study was wide enough to provide the maximum and minimum attainable transmission at any given brightness control voltage. In the black mode, the transmission of the LCD increased with an increase in the video level; this was the mode in which the TV was designated to operate normally. In the white mode, the transmission decreased with an increase in the video level, and the gray scale of the image on the LCD was reversed. The computer program, which generated the image to be displayed on the LCD according to equation (5), employed the families of curves in FIGS. 4a and 4b, and this difference in the gray scales of the black mode and of the white mode was taken into account.

Figure 5:
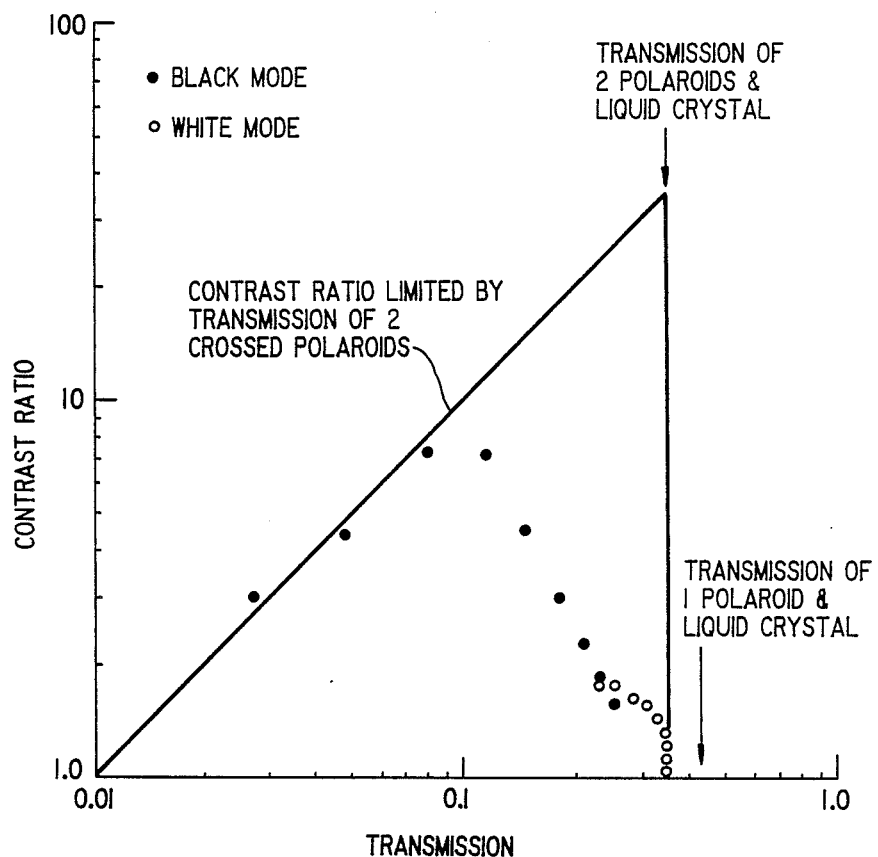
FIG. 5 is a graph illustrating the dependence of contrast ratio on transmission as the brightness control voltage of the LCD is varied.

Since the degree of dynamic-range compression depends on the contrast ratio of the LCD and the amount of light loss depends on the maximum transmission of the LCD, the relationship between the contrast ratio and the maximum transmission when the brightness control voltage is varied (FIG. 5) was determined, using the data shown in FIG. 4. In view of the physical process involved, there are some limitations on the operating characteristic of the LCD. For unpolarized incident illumination, the transmission of the polarizer is theoretically limited to 50%. The transmission of the polarizer with the liquid crystal was measured to be 43%. The transmission dropped to 35% when the analyzer was included and oriented to give minimum absorption. The difference in the theoretical and the measured transmission values could be accounted for in part by reflection at the glass-air interface and at the polaroid-air interface. The transmission of the crossed polaroids was about 1%, and this limited the minimum transmission, and thus the contrast ratio attainable with the LCD. The region in which the LCD can operate is therefore confined to the area enclosed by the right triangle in FIG. 5. The data points indicate the actual compromise in contrast ratio that has to be made if one wishes to operate the LCD at high transmission.

(b) Characteristics of OIP

Figure 6A:
FIGS. 6A and 6B illustrate digitized images of film strip without (top) and with (bottom) OIP.
Figure 6B:

FIG. 6 shows the baseline image of the film strip and the image acquired with OIP. In order to illustrate its capacity to vary the gamma of the overall system, the LCD was operated at its maximum attainable contrast ratio of 7.2 (FIG. 5), which corresponded to a brightness control voltage of 1.8 volts in the black mode (FIG. 4a). This contrast ratio gives the maximum compression of the image dynamic range, rather than providing the best match to the quantum noise characteristic. It is evident from FIG. 6 that the dynamic range of the film strip with OIP is lower than that of the baseline image without OIP. An edge enhancement effect can be observed at the boundaries between two adjacent steps; this is similar to the effect obtained in unsharp-masked images.

Figure 7:
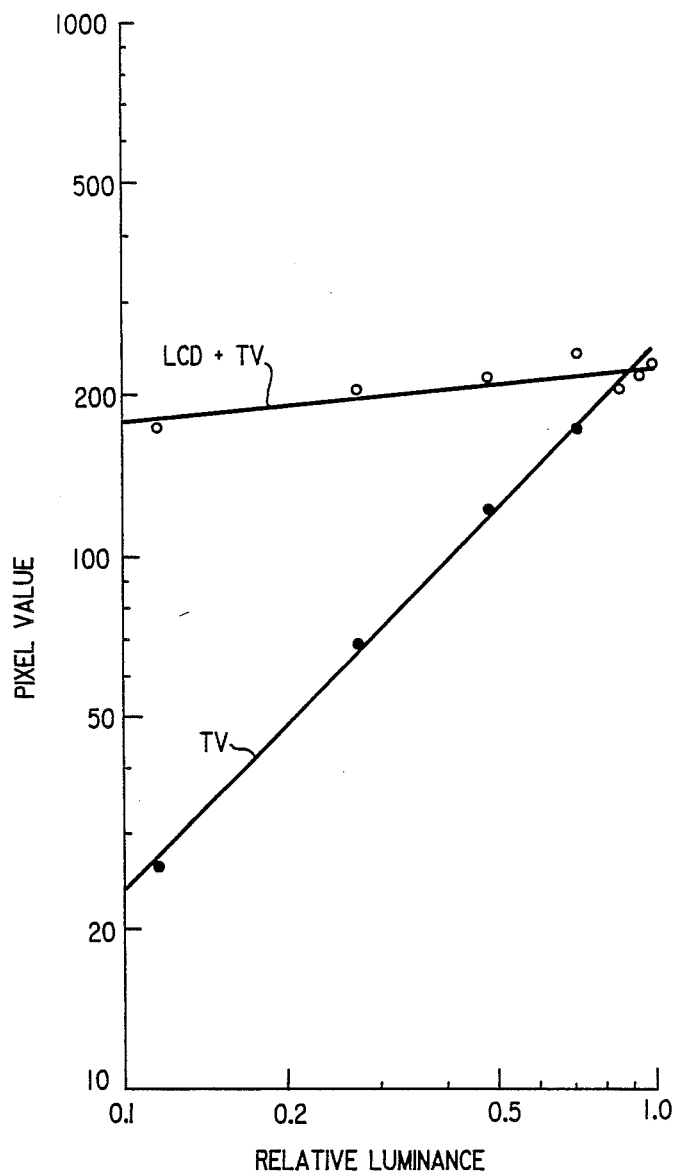
FIG. 7 is a graph illustrating the relationship of pixel values in the baseline (TV) and processed (LCD +TV) images shown in FIG. 6, wherein all data points were obtained from the average of two measurements on two similar images made under identical conditions.

The average pixel values of the density steps for both the baseline image and the image with OIP were measured and the results shown in FIG. 7 obtained. The curve for the baseline image shows the transfer characteristic of the TV camera. The curve is a straight line with a gamma value of unity, as expected for the Newvicon camera tube. With OIP, the effective gamma was reduced to a very low value, approximately 0.1 under the conditions used in FIG. 7. By choosing different contrast ratios, one can obtain any value of gamma between 0.1 and 1.0 for the film strip used.

Figure 8:
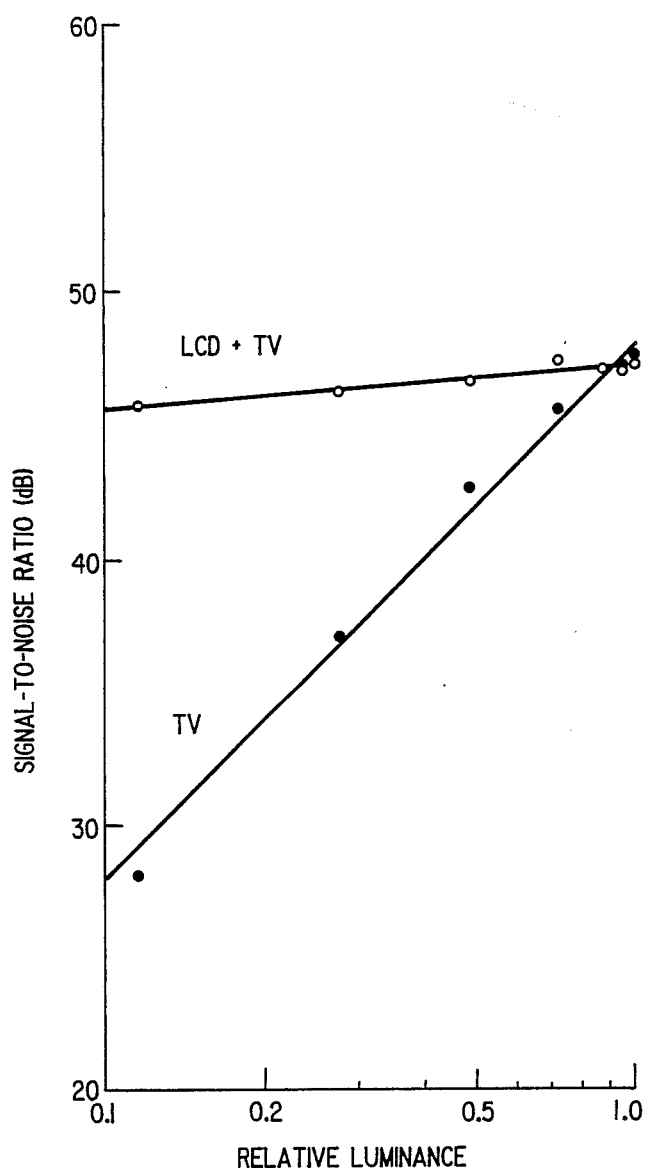
FIG. 8 is a graph illustrating the relationship of SNR vs relative luminence of subtracted baseline (TV) images and subtracted processed (LCD +TV) images, wherein data points for the processed image were obtained from the average of four measurements on each step.

To determine the SNR at various levels of the video signal, two images of the film strip were acquired under identical conditions, about 2 seconds apart. Both images were first corrected for black level. Then the logarithm of the pixel values was taken and the two images were subtracted from each other, similar to the process usually employed in digital subtraction angiography. The SNR was determined as the reciprocal of the standard deviation of the pixel-to-pixel variation at each density step on the subtracted image. The results obtained for a subtracted image without OIP and a subtracted image with OIP are shown in FIG. 8. Since the SNRs are obtained from subtraction of two images, the SNRs in the images before subtraction will be 3 dB higher than the values presented in FIG. 8, assuming that the noise in the two images being subtracted is uncorrelated and equal in magnitude. The curves in FIG. 8 show that the SNR of the image with OIP maintains a higher value over the entire image, whereas that of the baseline image decreased with lower luminance. The slopes of the two curves in FIG. 8 are the same as those of the corresponding curves in FIG. 7, within the accuracy of the experiment. This indicates that the measured noise level is independent of the signal level, as would be expected for the electronic noise of the TV camera.

(c) OIP of minified chest radiograph

Figure 9A:
FIGS. 9a and 9b illustrate the effect of dynamic-range compression on magnified chest radiograph, with FIG. 9a illustrating a digitized image without dynamic-range compression and FIG. 9b illustrating an image with dynamic-range compression by OIP.
Figure 9B:
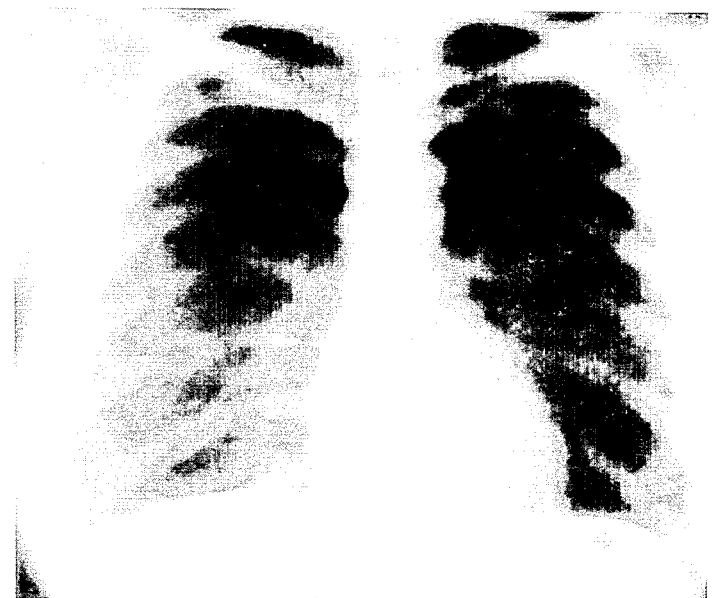

The effect of OIP on the minified chest radiograph is shown in FIG. 9. Both the unprocessed image and the image with OIP were acquired by the TV camera and printed with a multiformat camera. The lines across the middle of the images are due to 60 Hz interference in the system. The LCD was operated in the white mode, with a contrast ratio of 1.7. It is apparent that the global contrast between the lung field and mediastinum is reduced by OIP, whereas the local contrast of the vessels in the lung field is maintained. The visibility of structures in the mediastinal region of the OIP image is greatly improved because the video signal of the entire image is below the saturation level of the TV camera. Some degree of edge enhancement is also evident, similar to the effect produced by unsharp masking.

Experimentation Conclusions

In the above-described experiments, the mask image to be displayed on the LCD was acquired with the LCD removed, and real-time OIP was not utilized. For practical implementation of OIP, however, either a real-time feedback system or a real-time feedforward system, as discussed in the specific embodiments hereinafter described, can be incorporated which takes advantage of the video rate capability of the LCD. As an example of a feedback system, the signal driving the LCD is derived from the signal detected by the TV camera (FIG. 1). A feedforward system derives the signal driving the LCD from the image on the output phosphor of the II. In the latter case, the image from the output phosphor may be monitored directly by splitting off of a small fraction of the light, with a partially silvered mirror, to a second TV camera or other image detecting device. The response time of the feedback or feedforward is limited only by the field rate of the LCD, i.e., 60 Hz. This rate is faster than the breathing rate and the cardiac cycle; therefore, real-time OIP can be implemented in dynamic imaging systems.

The OIP studied in these experiments control the gamma value of the overall image acquisition system. Most TV cameras have electronic gamma adjustments; however, there are two major differences between OIP and electronic gamma adjustments made with a nonlinear electronic amplifier: (i) The optical gamma control is performed before the image is detected by the TV camera. Therefore, electronic noise is introduced only after dynamic-range compression, and thus the SNR in the low-signal regions of the image is improved. (ii) The optical gamma control affects mainly low spatial frequencies, due to blurring of the mask image on the LCD. Therefore, local contrast is maintained, whereas the global contrast is compressed.

Digital unsharp masking performed after digitization can compress the dynamic range of an image. However, noise is introduced prior to digital image processing, so that it does not provide the same improvement in SNR as does the OIP studied here. Moreover, real-time digital image processing is feasible only for relatively small image matrix sizes, whereas the real-time capability of OIP is not limited by matrix size.

Similar to the electronic noise of TV cameras, digitization noise is independent of the signal level. Matching of the dependence of digitization noise on the signal level to that of quantum noise has been studied, and it was found that square-root amplification before digitization produces the best match. With OIP, both electronic noise and digitization noise can be matched to quantum noise in one step, so that square-root amplification is not necessary. Furthermore, when digitization noise is matched to quantum noise, digitization bits can be utilized efficiently. Therefore, a smaller number of bits is required, and this has significant implications for fast digitization of images of large matrix size.

Besides being applicable to II-TV systems, OIP can be applied to any system in which TV cameras are used for dynamic-range compression and SNR improvement. For example, in some teleradiology systems, TV cameras are employed to digitize radiographs that can have a dynamic range of more than 100. It is possible to improve the image quality by use of OIP in such systems.

In conclusion, based on the experiments conducted, it was demonstrated that, by using OIP with an LCD, one can compress the dynamic range and improve the SNR of an image acquired by a TV camera when electronic noise is the major noise source.

Next described are specific considerations involved in optical image processing according to the present invention, followed by descriptions of particular embodiments of the invention.

In the implementation of optical image processing with a liquid crystal display, two signals are required to drive the LCD in the OIP module. They are: (i) the brightness control voltage Vb and (ii) the voltage Vp which drives the individual pixels on the LCD. The voltage Vb depends on two independent parameters, namely, the selected overall system gamma (G) of the II/OIP/TV system and the contrast ratio (C) of the unprocessed image at the output phosphor of the II. The voltage Vp is related to three independent parameters, namely, G, C, and the maximum luminance, MAX L, of the unprocessed image. The relationships of these parameters to Vb and Vp re as follows.

(a) Brightness control voltage $V_b$

Figure 10:
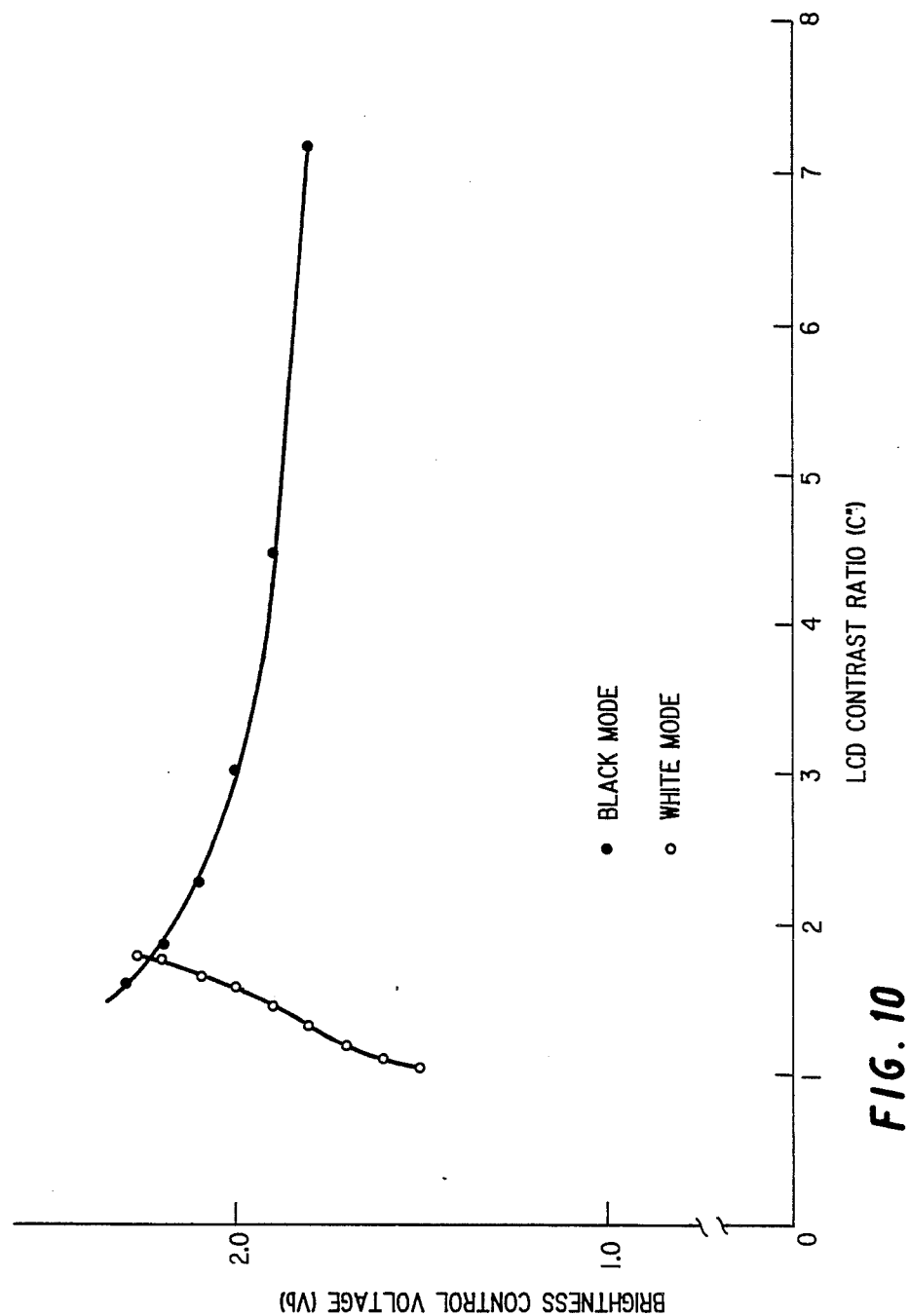
FIG. 10 is a graph illustrating the variation of brightness control voltage ($V_b$) and the LCD contrast ratio ($C''$)

From FIG. 4, one can plot Vb against C'', as shown in FIG. 10. For the black mode, only data for Vb above 1.8 volts are included. The value of 1.8 volts corresponds to the maximum contrast ratio obtainable with the LCD that was used. Below this voltage, the contrast ratio of the LCD covers the range between 3 and 7, which duplicates the contrast ratios that can be provided by Vb above 1.8 volts; however, the transmission of the LCD is lower. Therefore, Vb settings above 1.8 volts are preferred in the black mode. Furthermore, it can be seen in FIG. 10 that an LCD contrast ratio between 1.6 and 1.8 can be obtained with either the black or the white mode. However, the white mode is preferred because it provides higher transmission at the same contrast ratio. If the dependence of Vb on C'' is denoted as f', then Vb=f'(C''). Because $$C'' = C^{1-G/G'} \quad (9)$$

which is derived from equation 7 and the above-noted relationship G=G'G'', then one obtains $$Vb = f'(C^{1-G/G'}) \quad (10)$$

Since the gamma of the TV camera, G', is known, we may define a function f such that $$Vb = f(G, \log C). \quad (11)$$

Figure 11:
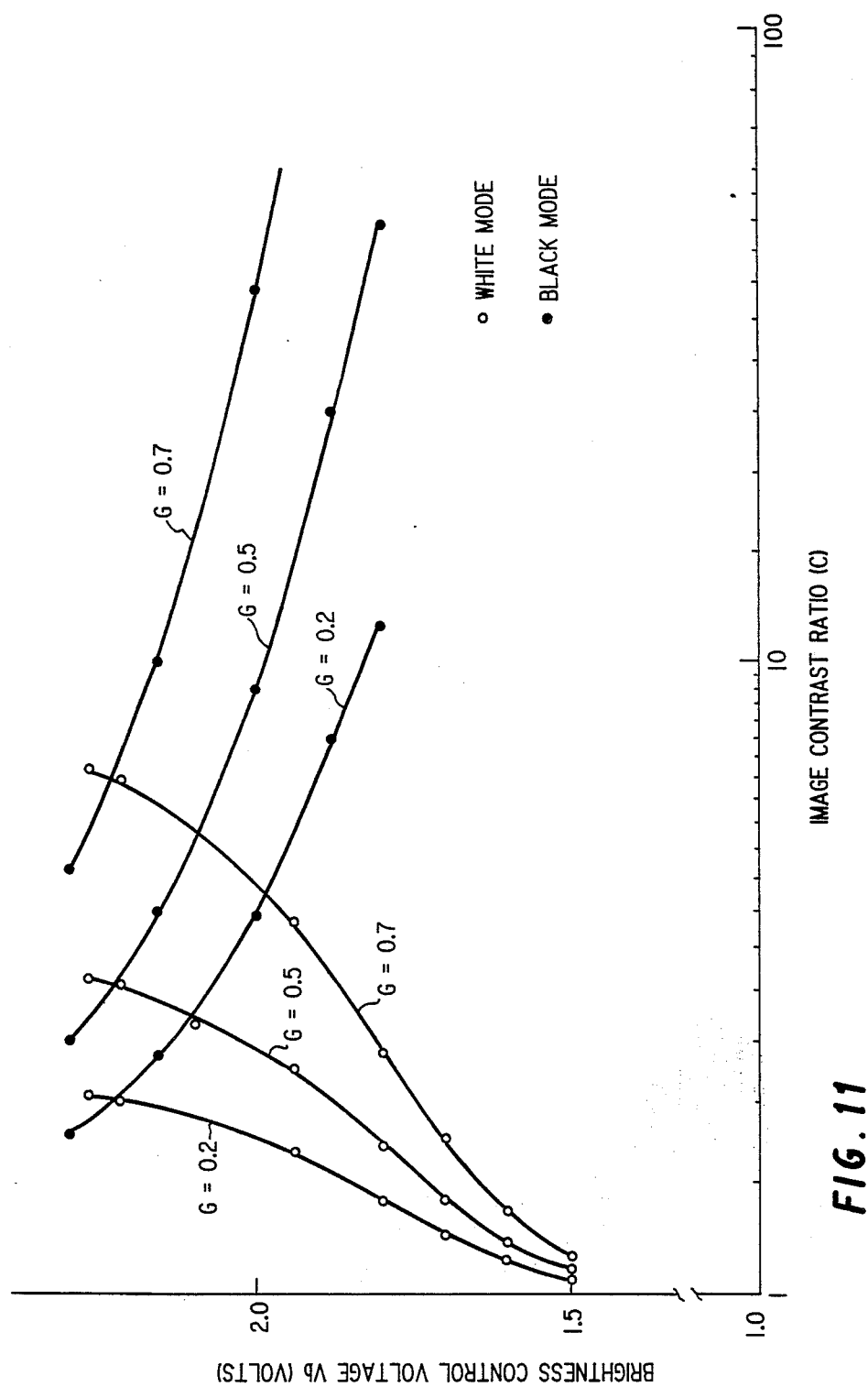
FIG. 11 is a graph illustrating the relationship between the LCD brightness control voltage $V_b$ and the overall II-TV image contrast ratio C and gamma G.

The dependence of Vb on G and log C is shown in FIG. 11.

(b) Pixel driving voltage

For G''>1, equation 5 indicates that T is at a minimum, MIN T, when L is at its maximum value, MAX L. MAX L can be determined from the image and MIN T is selected by Vb, so that the constant b/a can be determined from $$b/a = (\text{MIN T}) (\text{MAX L})^{1-G''} \quad (12)$$

Substituting b/a into equation 5, then one obtains $$T = (\text{MIN T}) (\text{MAX L})^{1-G''} L^{G''-1} \quad (13)$$

FIGS. 4a and 4b illustrates the relationship among Vp, T, and Vb. If Vp is expressed as a function g' of Vb and T, then one obtains $$Vp = g'(Vb, (\text{MIN T}) (\text{MAX L})^{1-G''} L^{G''-1}) \quad (14)$$

by using the above expression for T. Since Vb, MIN T, MAX L, G''. and L can be expressed in terms of G, log C, MAX log L, and log L, one may then define a function g such that $$Vp = g(G, \log C, \text{MAX} \log L, \log L) \quad (15)$$

Figure 12:
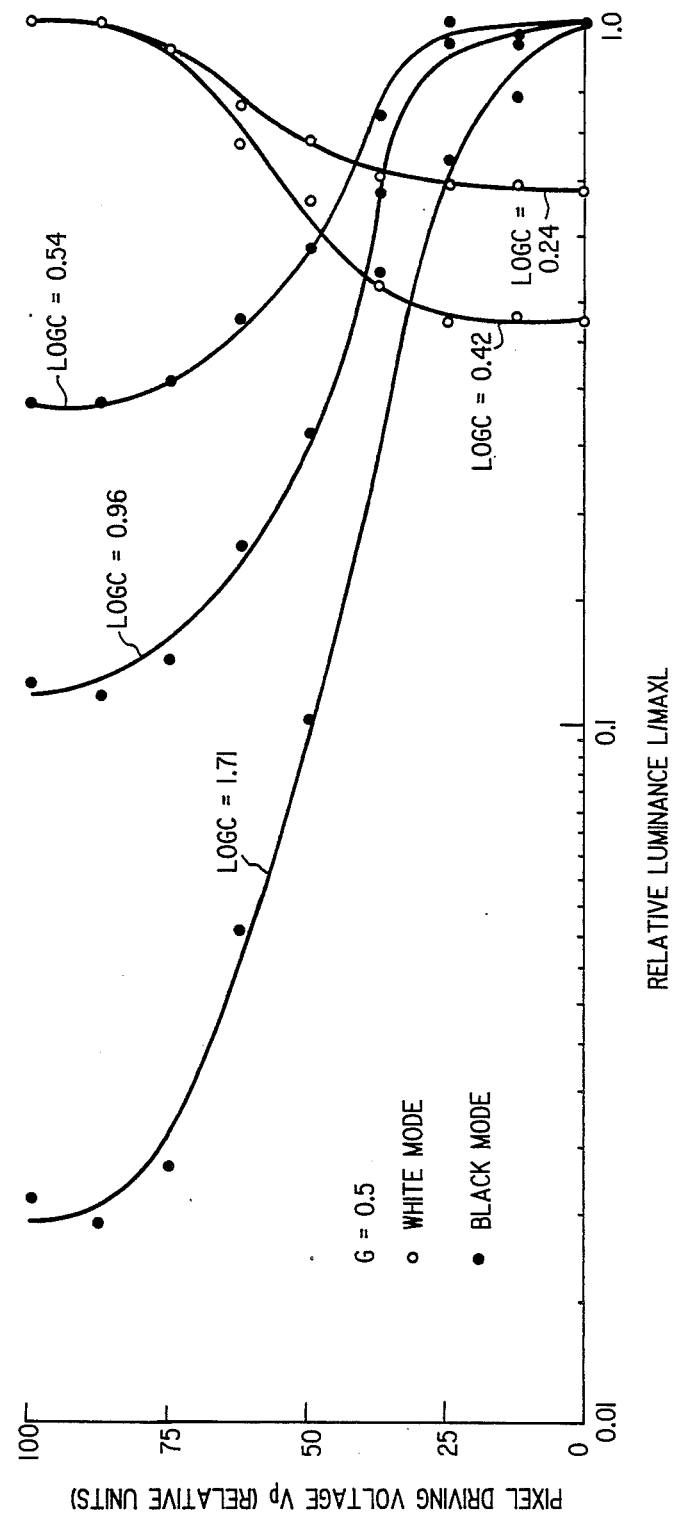
FIG. 12 is a graph illustrating the dependence of the pixel driving voltage $V_p$ on relative luminence L/MAX L for G=0.5 and various values of log C for a system having a TV camera tube with gamma $G'=1$.

As an example, in FIG. 12 is shown the dependence of Vp on (log L - MAX log L) for G=0.5 and various values of log C for a system having a TV camera tube with G'=1.

Figure 13:
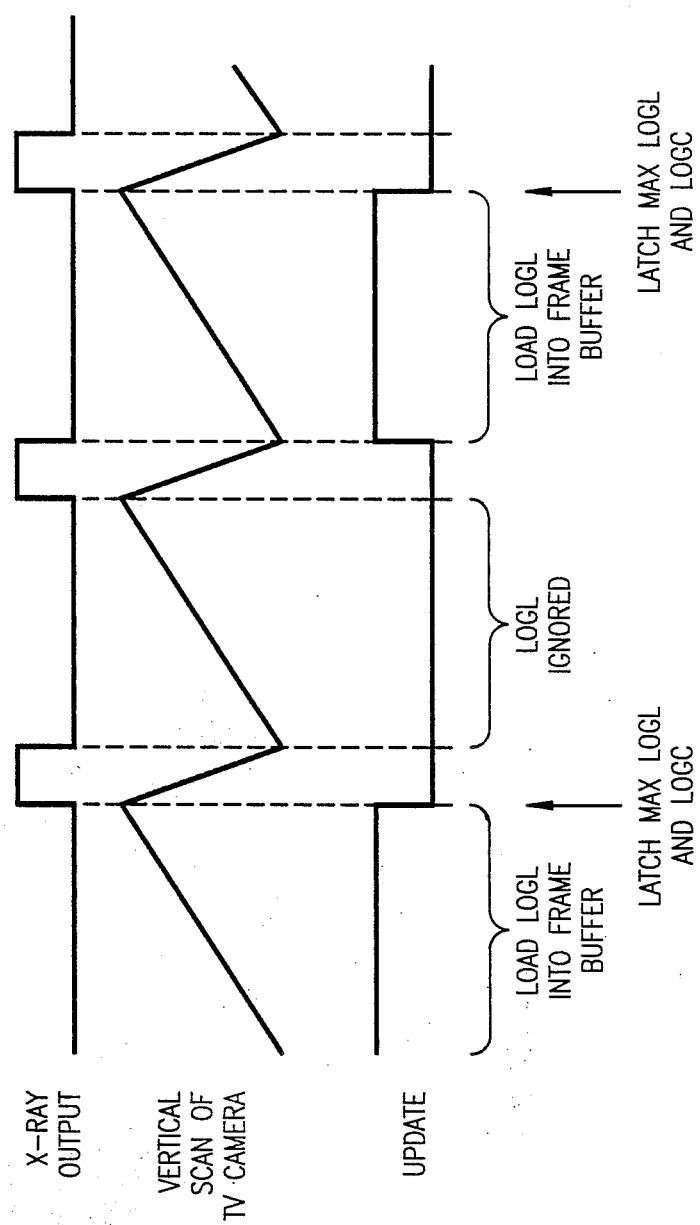
FIG. 13 is a timing diagram illustrating the timing at which signals (LOG L, MAX LOG L AND LOG C) used in the control of the LCD are obtained.

Since MAX log L and log C are unknown until a frame of the image is fully scanned, the information required for the generation of the signals driving the LCD is based on an unprocessed image of earlier frames. In one approach according to the invention, an input called UPDATE is produced to select a frame in the set of previous frames for the determination of the driving signals. An example of the timing for the signal UPDATE is shown in FIG. 13. This particular example illustrates a case in which the first and third frames are used for updating of the mask image, whereas the second frame is not.

Summarizing the above, the OIP circuit accepts two inputs, UPDATE and G, and it produces a processed output image by determining Vb and Vp, according to expressions (11) and (15) above, from a given set of image data that provide log C, MAX log L, and log L. The following are descriptions of specific embodiments which perform this operation.

Figure 14:
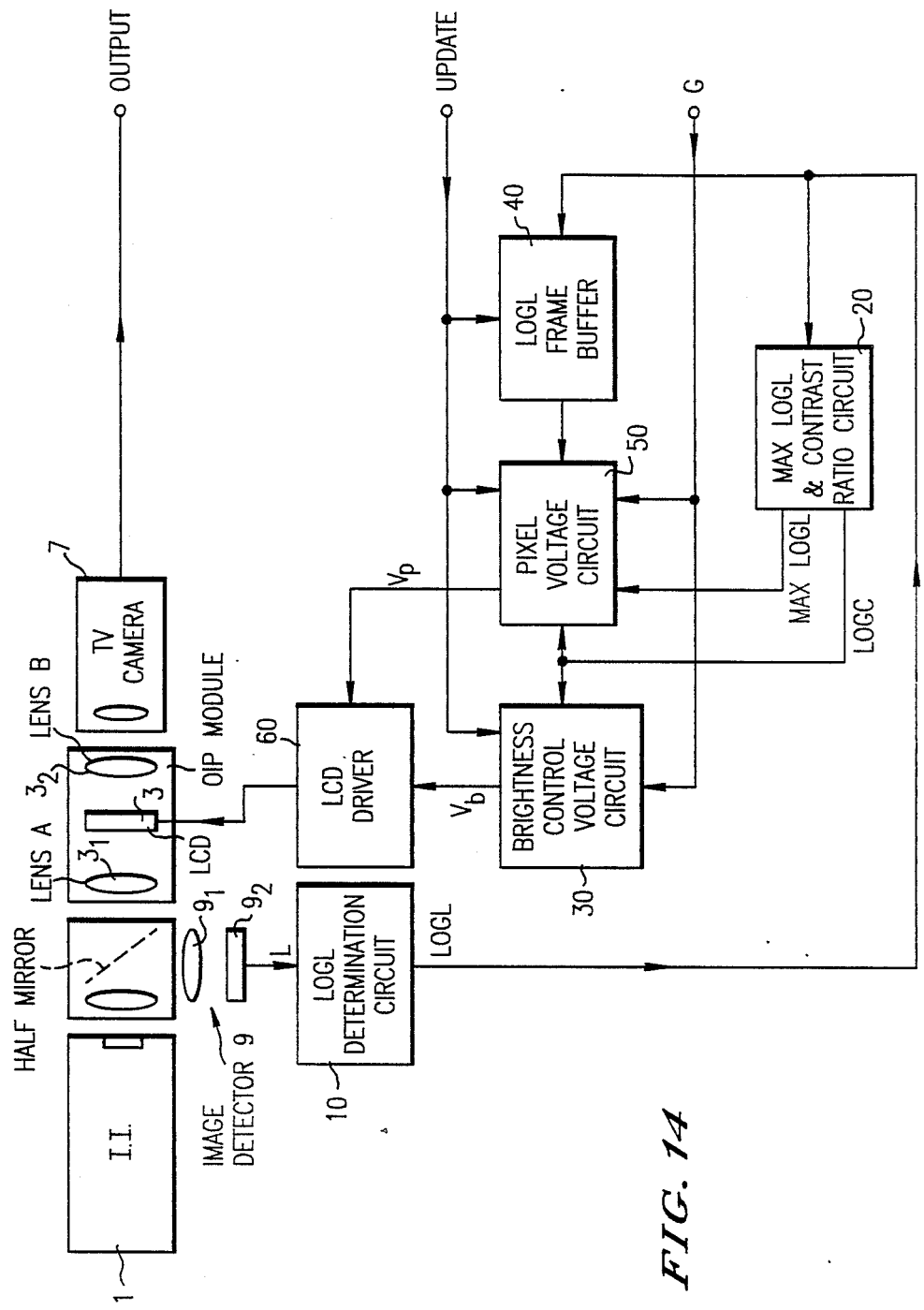
FIGS. 14 and 15 are block diagrams illustrating two embodiments of the present invention.

A first embodiment of the OIP circuit is shown in FIG. 14 and is next described in terms of the functions performed by the various blocks which may be representative of hard-wired circuits or software subroutines. The signal of the unprocessed image at the output of the image detector 9, e.g., a lens 9₁ and a second TV camera 9₂ is fed to circuit 10, which functions to determine log L. The scanning of the image detector and of the LCD is synchronized to the scanning of the TV camera. If the image matrix of the detector is different from that of the LCD, block 10 also transforms the matrix size to match the image matrix of the LCD. The output of block 10 is a digital raster scan of the image. Log L from block 10 is sent to blocks 20 and 40.

Block 20 accepts log L from block 10 and determines the maximum and minimum values of log L within each frame. The log of the contrast ratio, which is the difference between the maximum and minimum values of log L, is also determined at the end of each frame. At the beginning of the vertical retrace period of the scan, the values of MAX log L and log C are available as the output of block 20.

Block 30 latches the values of log C and the input G int its internal registers at the beginning of the vertical retrace period if UPDATE transits from high to low, as shown in FIG. 13. At the beginning of the vertical scan, the value of Vb calculated according to equation (11) is then sent to block 60 and drives the LCD 3.

Block 40 stores a frame of log L, and the stored image is scanned and read by block 50, in synchrony with the scanning of the LCD. If UPDATE is high, after a location (i.e., a pixel of the image) is read and before the reading of the next location, the value in that memory location is updated by the value of log L from block 10. This is to ensure that the stored image is read out before it is overwritten by the new image.

Block 50 latches the values of log C, G, and MAX log L into its internal registers at the beginning of the vertical retrace period if UPDATE transits from high to low. According to equation (15), block 50 outputs a raster scanned value of Vp corresponding to each input pixel of the scanned log L from block 40, based on its stored values of log C, G, and MAX log L. Vp is sent to block 60 to drive the LCD. The matrix for the storage of the image in block 40 has the same size as that of the image matrix on the LCD.

The LCD is located inside an OIP module consisting of lens 3₁, the LCD 3, and lens 3₂. Lens 3₁ focuses the image from the light distributor to an image plane. and lens 3₂ projects the image produced by lens 3₁ to infinity. The LCD 3 may be displaced slightly from the image plane of lens 3₁. The amount of displacement depends on the amount of blurring desired for the unsharp-masking technique. In this respect, to the extent that the lens 3₁ and 3₂ focus the image from the light distributor, i.e., II 1, onto an image plane of the TV camera, the lens 3₁ and 3₂, similar to the focusing members 2 and 6 shown in FIG. 1, may be considered as part of the TV camera system.

Figure 15:
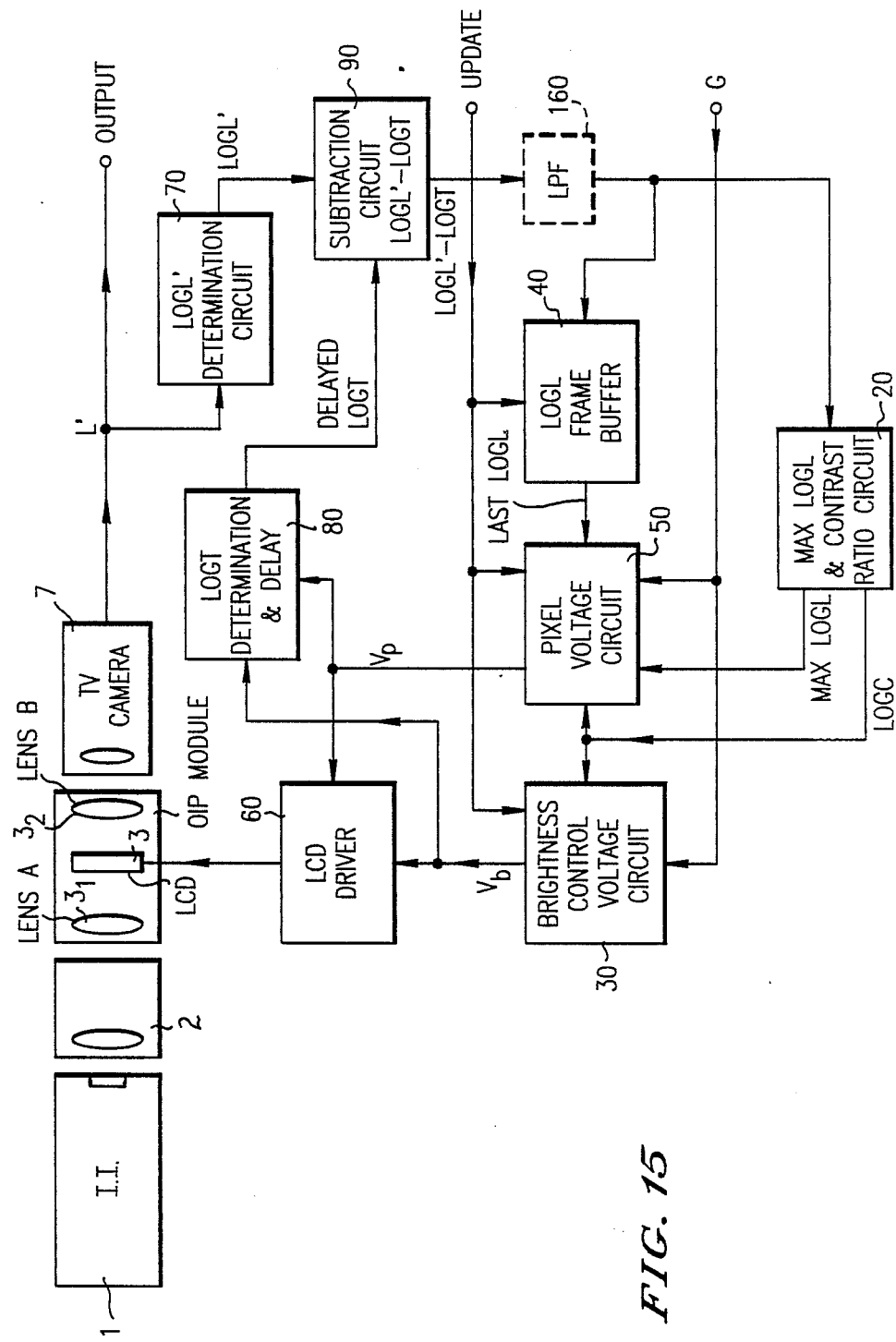

A second embodiment of the present invention is shown in FIG. 15. The advantage of this design is that the image detector 9 in FIG. 14 can be eliminated while the capability of acquiring processed image frames without interruption is maintained. Moreover, without splitting of the light path, the light output of the image intensifier can be better utilized by the TV camera 7. In this design, log L is determined from the video signal of the TV camera and the transmission of the LCD according to $$\log L = \log L' - \log T - \log a \quad (16)$$

which can be derived from equation 1. Block 70 transforms the scanned higher-resolution image signal of the TV camera 7 to a scanned output of an image matrix of the same size as that of the LCD 3 and determines log L'. From the voltages applied to the LCD driver (block 60), block 80 determines log T of the LCD pixel being scanned by using the curves shown in FIGS. 4a or 4b, and delays the output by the scan time of one TV frame. As a result, the output of block 80 corresponds to the transmission of the LCD pixel of the previous frame. The delay is incorporated because the output of the TV camera 7 is the scanned image of the x-ray exposure using the previous frame on the LCD 3 as the mask image. Block 90 performs subtraction according to equation (16) to provide a scanned log L output. This signal (log L' - log T) can be used in the same way as is the output of block 10 in FIG. 14.

Thus, the circuits of blocks 70, 80 and 90 are used to reconstruct the image as it would have been produced by the TV camera system without modulation of the II output by the LCD. In other words, blocks 70, 80 and 90 effectively remove the effects of LCD modulation from a video frame so that new values of $V_b$ and $V_p$ can be derived for LCD modulation of the image corresponding to the next video frame.

As shown in dashed lines, a low pass filter (block 160), discussed hereinafter, can advantageously be placed between the output of block 90 and the inputs to blocks 20 and 40.

The operations performed by the system when it acquires an image sequence can be summarized as follows. Before the first frame of the x-ray exposure, the image detected by the TV camera is uniformly dark. Thus, a uniform image is loaded onto the LCD by the system; therefore, the first frame of the x-ray image is acquired with a uniform mask image. By the end of the first frame, log C and MAX log L are calculated. The updated mask image is loaded onto the LCD during the second frame. By the end of the second frame, the loading of the updated mask image onto the LCD has been completed, and the third frame can be acquired with OIP using the updated mask image. For subsequent images, the signal UPDATE controls whether the mask image will be updated by a new image frame, and there is a minimum two-frame delay between a frame being selected to generate the mask image and a processed frame being acquired with the mask image generated from the selected frame.

Figure 15A:
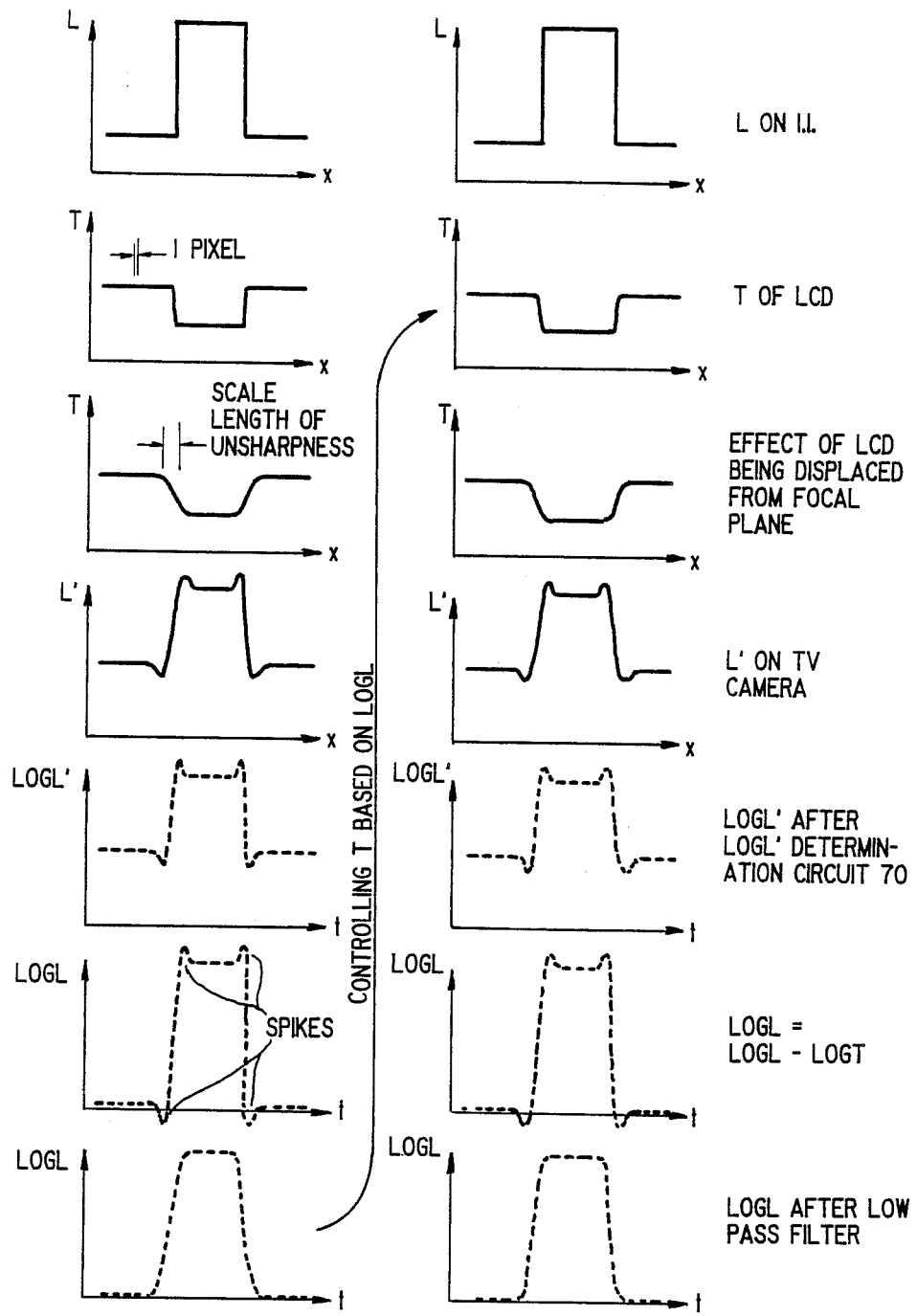
FIG. 15a is a collection of sketches illustrating for two successive frames of TV video different signals produced in the embodiment shown in FIG. 15 in correspondence to one scan line of the TV camera.

FIG. 15a is an example of the different signals corresponding to one scan line of the TV camera as produced in the embodiment shown in FIG. 15. When the size of the pixels on the LCD is much smaller than the scale length of unsharpness, as shown in FIG. 15a, the low pass filter 160 in FIG. 15 should be included. As sketched in FIG. 15a, the log L recovered by the circuit before low pass filtering has high frequency spikes. The low pass filter 160 removes the high frequency so that a more accurate estimate of log L is obtained. The low pass filter 160 should have a temporal bandwidth equivalent to the spatial bandwidth of the blurring due to the displacement of the LCD from the image plane.

Since other embodiments described hereinafter are simplifications of the second embodiment shown in FIG. 15, the timing relationship among the signals of the second embodiment is next described in relation to FIG. 16.

Figure 16:
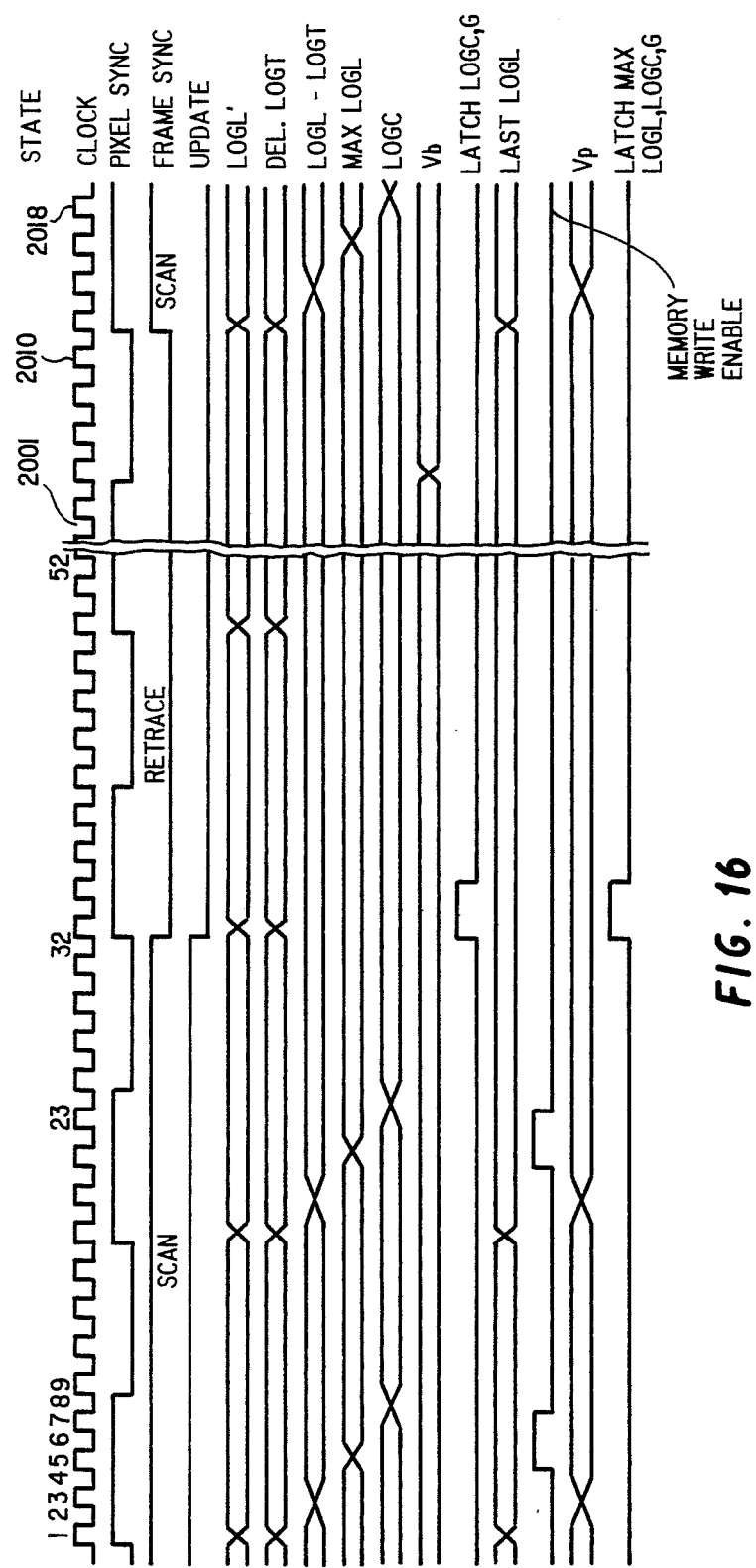
FIG. 16 is a timing diagram illustrating the timing of various signals occurring in the embodiment shown in FIG. 15.

The first four lines of the timing diagram shown in FIG. 16 are: clock, pixel sync., frame sync., and update. They are used by the circuits to synchronize the data transfer and computation. Each state of the clock pulse is numbered.

The fifth line of the timing diagram of FIG. 16, illustrates log L' from block 70 and line 6 illustrates delayed log T from block 80. New values of log L' and log T are output for every pixel (states: 2, 18, 34, 50, and 2013). From log L' and log T, block 90 computes log L' - log T for all pixels during scanning (states: 5, 21, and 2016). The output of block 90 is constant during retrace (states: 33 to 2011). Since log L' - log T is just log L, block 20 accepts input from block 90 and determines the running MAX log L (states: 7, 23, and 2018) and log C (states: 10 and 26) for every pixel. During retrace, MAX log L and log C of the scanned frame are available (state: 33). Block 30 then latches log C and G at the beginning of the retrace period (state: 33), as shown, and outputs a new Vb before the beginning of the next scan if UPDATE triggers (transition between states 32 and 33) it to do so. During the scan, block 40 outputs the last log L stored in its memory at each pixel sync pulse (states: 2, 18, and 2014). It updates the stored log L at each pixel sync pulse (states: 5 and 21) if UPDATE is high. During the scan, at each pixel sync pulse, block 50 computes Vp (states: 5, 21, and 2016) from last log L and MAX log L, log C and G. Similar to block 30, block 50 latches MAX log L, log C and G at the beginning of the retrace period (state: 33) if UPDATE triggers (transition between states 32 and 33) it to do so.

Figure 17:
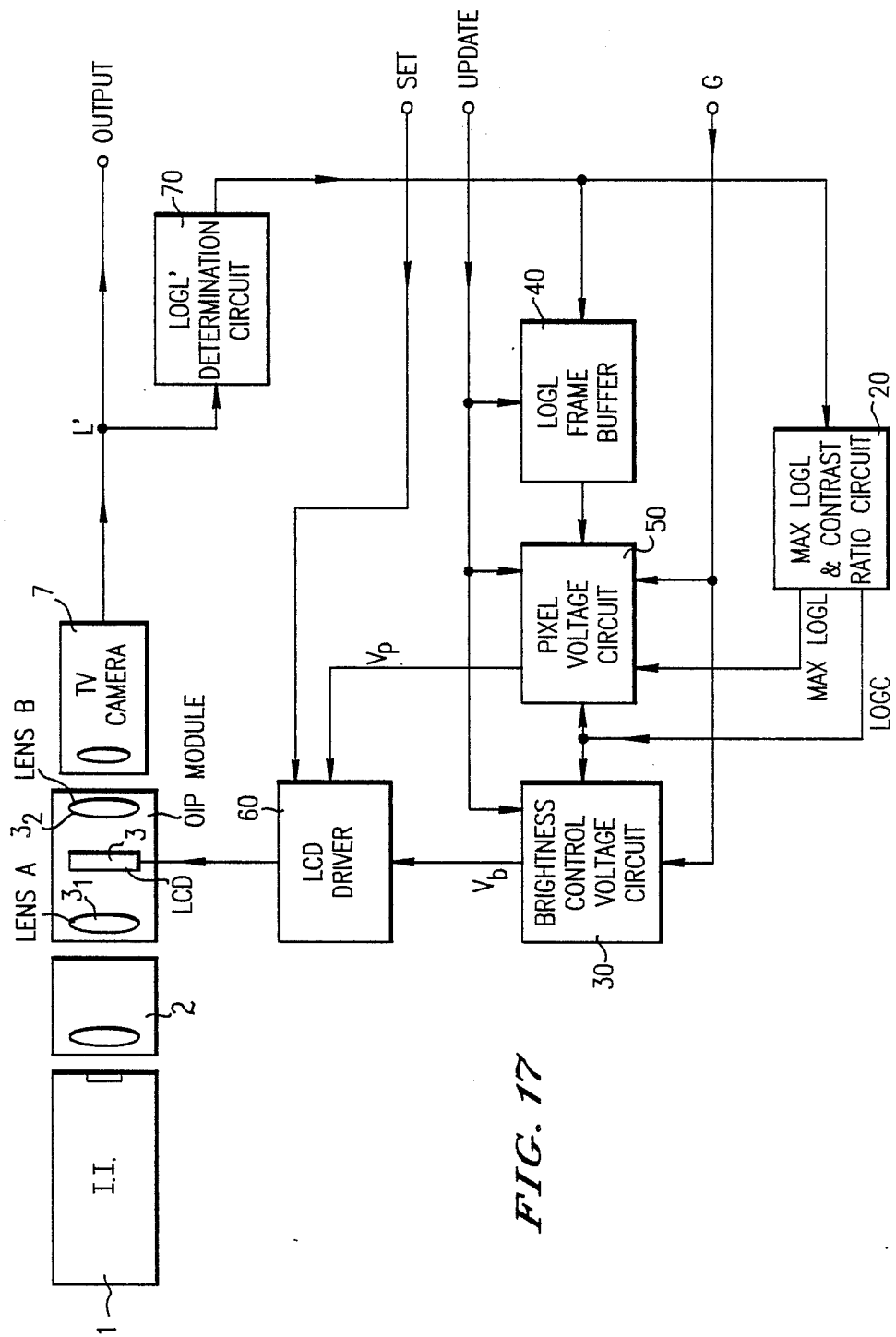
FIGS. 17, 19, 20 and 22 are block diagrams of further embodiments of the present invention.
Figure 18:
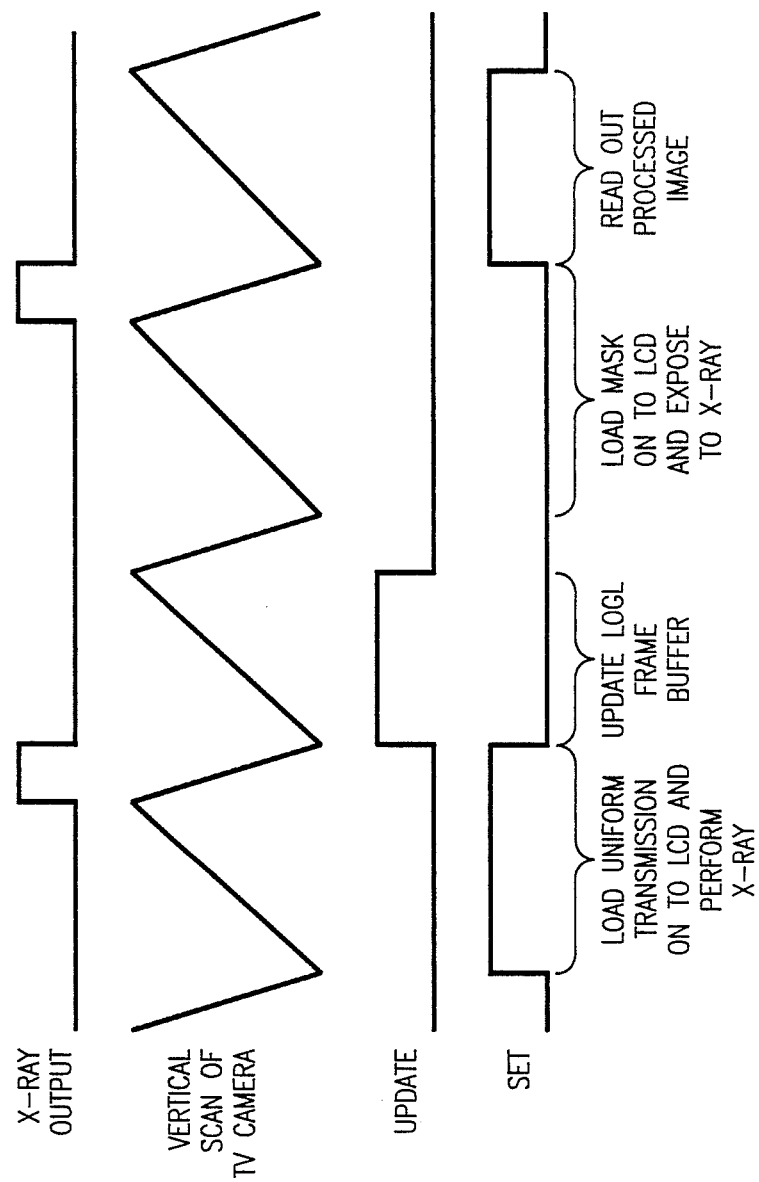
FIGS. 18, 21 and 23 are timing diagrams illustrating the timing of operations performed in the embodiments shown in FIGS. 17, 20 and 22, respectively.

A third embodiment of the invention is shown in FIG. 17. The difference between the second and third embodiments shown in FIGS. 15 and 17 is that in the third embodiment, blocks 80 and 90 are deleted and the LCD driver, block 60, accepts an input to set the LCD to uniform transmission. The advantage of this design is its simplicity. However, it has to interrupt the acquisition of processed images in order to obtain a mask image. An example of the timing of the signals UPDATE and SET is illustrated in FIG. 18. The LCD is first set to uniform transmission. The image acquired by the TV camera through the uniformly transmitting LCD will provide log L to update the frame buffer. A mask image is then calculated from the scanned log L and loaded onto the LCD. A second x-ray exposure produces a processed image. While the processed image is being read out, a uniform image can be loaded onto the LCD, if the next frame is used for updating of the mask image. If the image does not change significantly from one frame to another, such as during visualization of a slow moving object, the mask image may not be updated for a number of frames, which can be controlled periodically in a predetermined manner.

Figure 19:
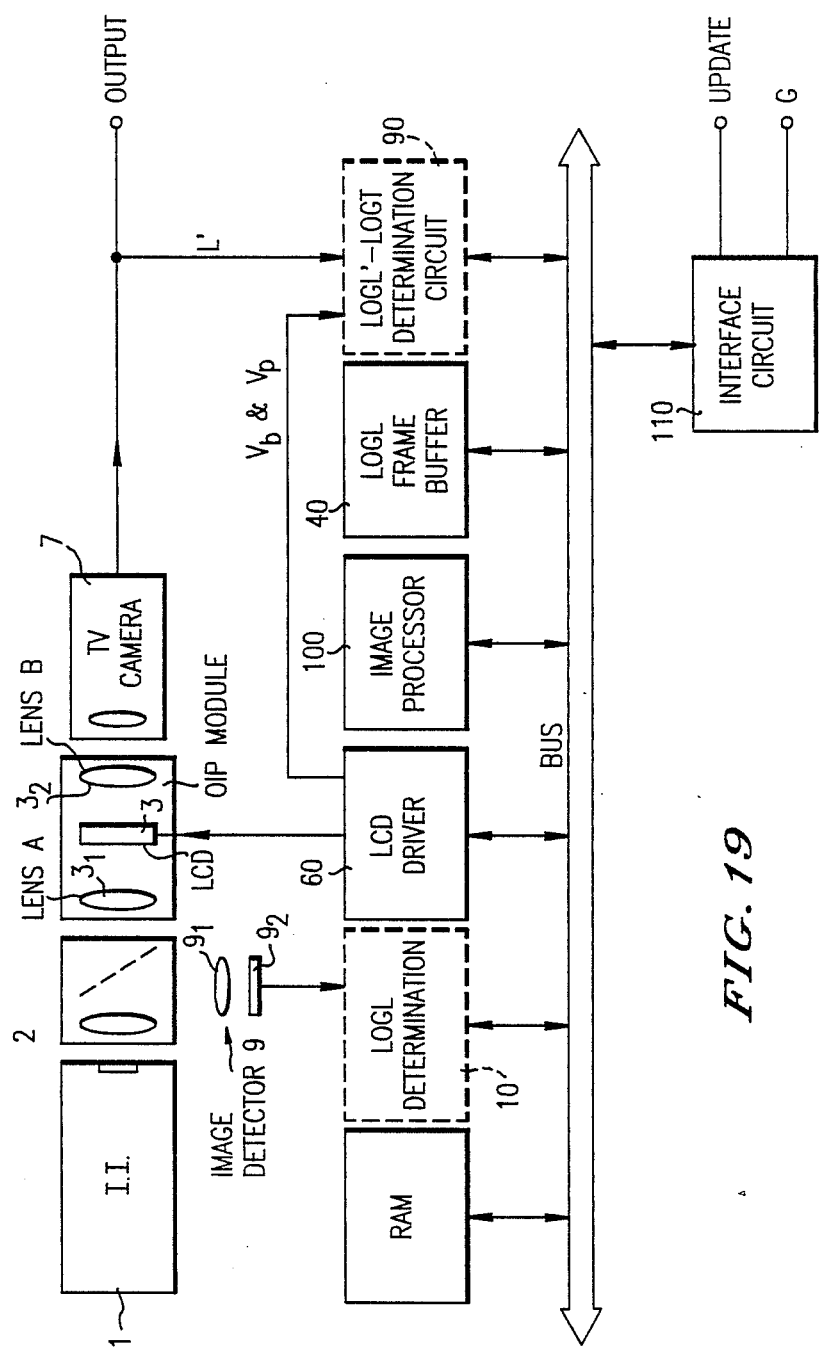

A fourth embodiment is shown in FIG. 19. The main features of this embodiment are that the different circuits communicate through a bus, and that most calculations are performed by the image processor 100. Block 90 of the fourth embodiment determines log L from L', Vb, and Vp. It obtains Vb and Vp from block 60 and L' from the TV camera 7. Only one of blocks 10 and 90 is needed to implement OIP: both are included in FIG. 19 in order to illustrate the options for implementation of this design.

For each frame, the image processor reads in UPDATE and G from the interface block 110 at the beginning of the vertical retrace period. From the value of log C stored in its internal register, the image processor 100 calculates Vb, which is sent to the LCD driver 60 at the beginning of the vertical scan. The image processor 100 then processes the image pixel by pixel from the frame buffer 40, and sends the calculated Vp to the LCD driver 60 to control the transmission of the LCD pixels. Depending on the value of UPDATE, it may read in new values of log L from either block 10 or block 90 to update the frame buffer 40 and the parameters MAX log L and log C.

Figure 20:
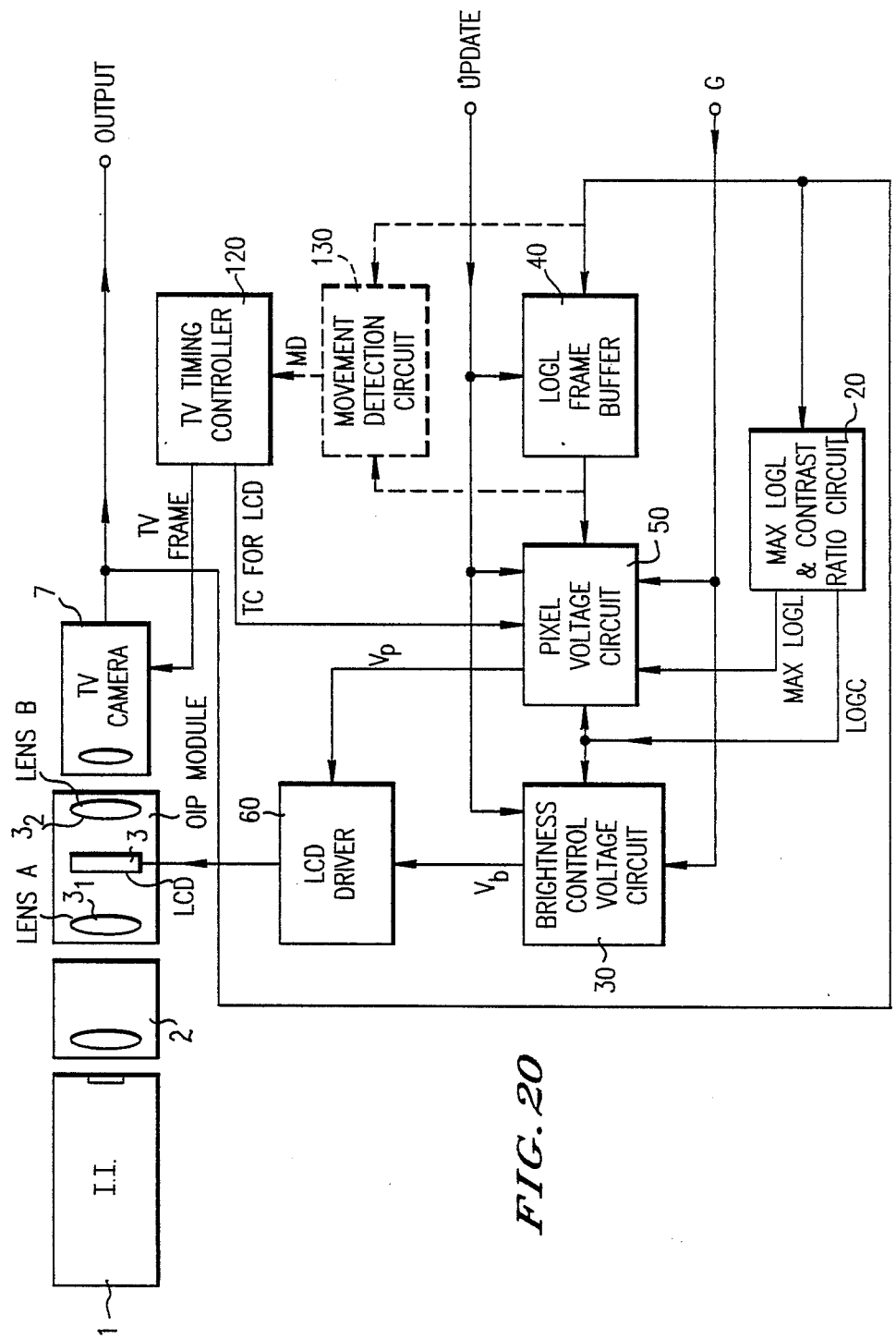

Referring now to FIG. 20, there is shown a fifth embodiment of the invention in which serial images, having uniformly transmitted (through the LCD) frames inserted therein, are acquired. This embodiment, which is considered the simplest example for the control of the optical transmission at the LCD, is described below.

The optical transmission of each LCD element is controlled by the image at the I.I. output phosphor. In this example, some non-modulated frames are inserted in a series of frames in order to determine the necessary LCD intensity modulation.

Figure 21:
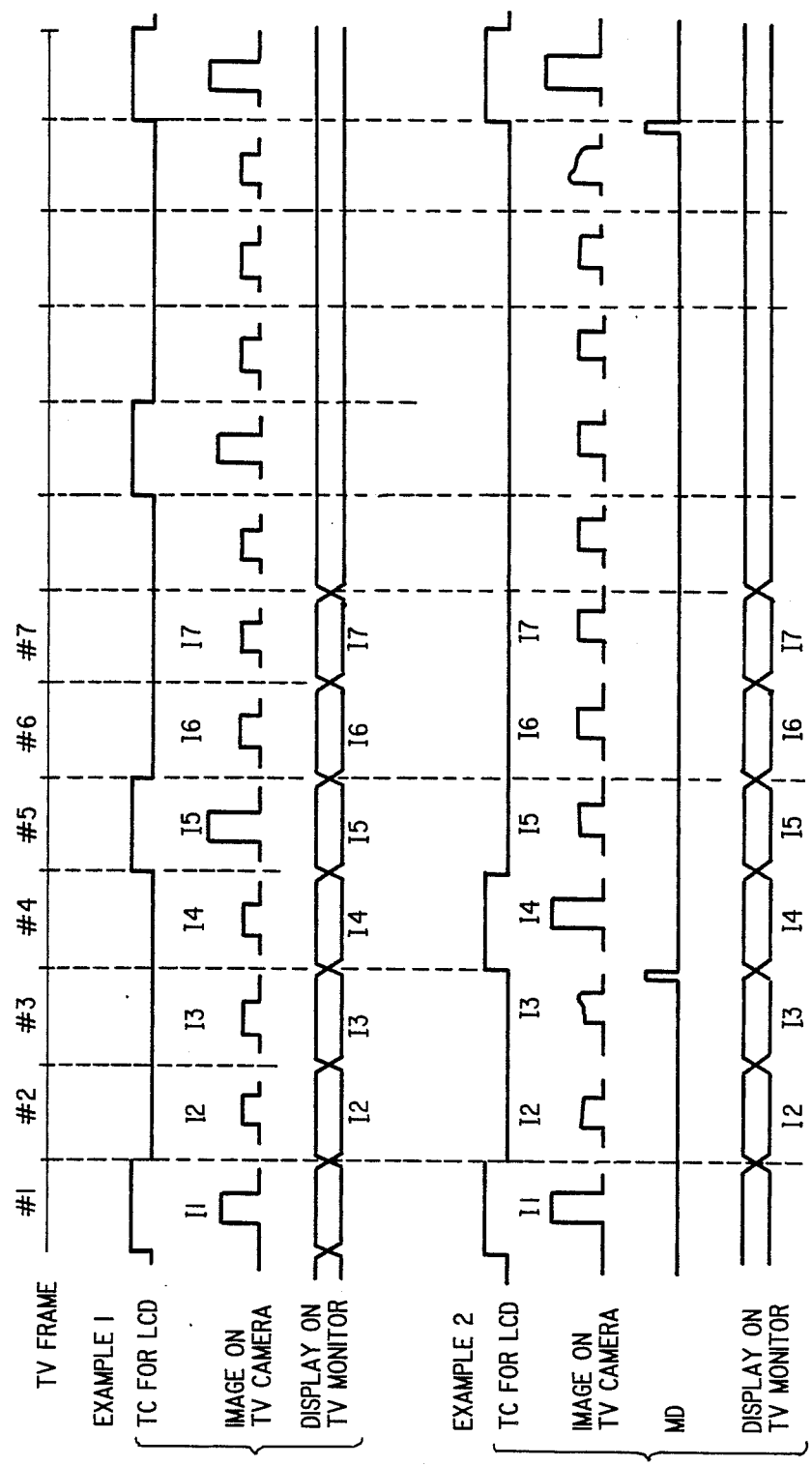

The embodiment shown in FIG. 20 includes a TV timing controller 120. A timing diagram of signals associated with controller 120 is shown in FIG. 21. The transparent control (TC) signal controls the decision of modulation/non-modulation at the LCD. The MD ENABLE input signal enables the controller 120 to respond to the MD signal. If MD ENABLE is low, the controller 120 will periodically change TC, as shown in example 1 of FIG. 21. If MD ENABLE is high, TC will be triggered by MD through the controller 120, as shown in example 2 of FIG. 21. When TC is high (see frame #1), the image on the I.I. output phosphor is picked-up by the TV camera without modulation. This image (I1) is used to control the optical transmission of each LCD element. After frame #2, image series (I2) whose dynamic range is compressed by the modulation of LCD is obtained through the TV camera.

The level of the signal TC in example 1 shown in FIG. 21 is periodically changed in order to control the LCD more accurately. This example is applicable to the case where the subject is stable or has slight movement.

In example 2 shown in FIG. 21, a timing example applicable to a moving subject is shown. The level of the signal TC is controlled by the movement detection circuit 130 shown with broken lines in FIG. 20. In this circuit 130, movement of a subject is checked by comparing the current frame to the previous frame. If movement is detected, the signal MD is generated at the end of the frame.

Modulated images are displayed on the TV monitor. However, when the signal TC is high, the image of the previous frame is displayed instead of the current image to avoid an unacceptable sudden flash of the non-modulated image.

Figure 22:
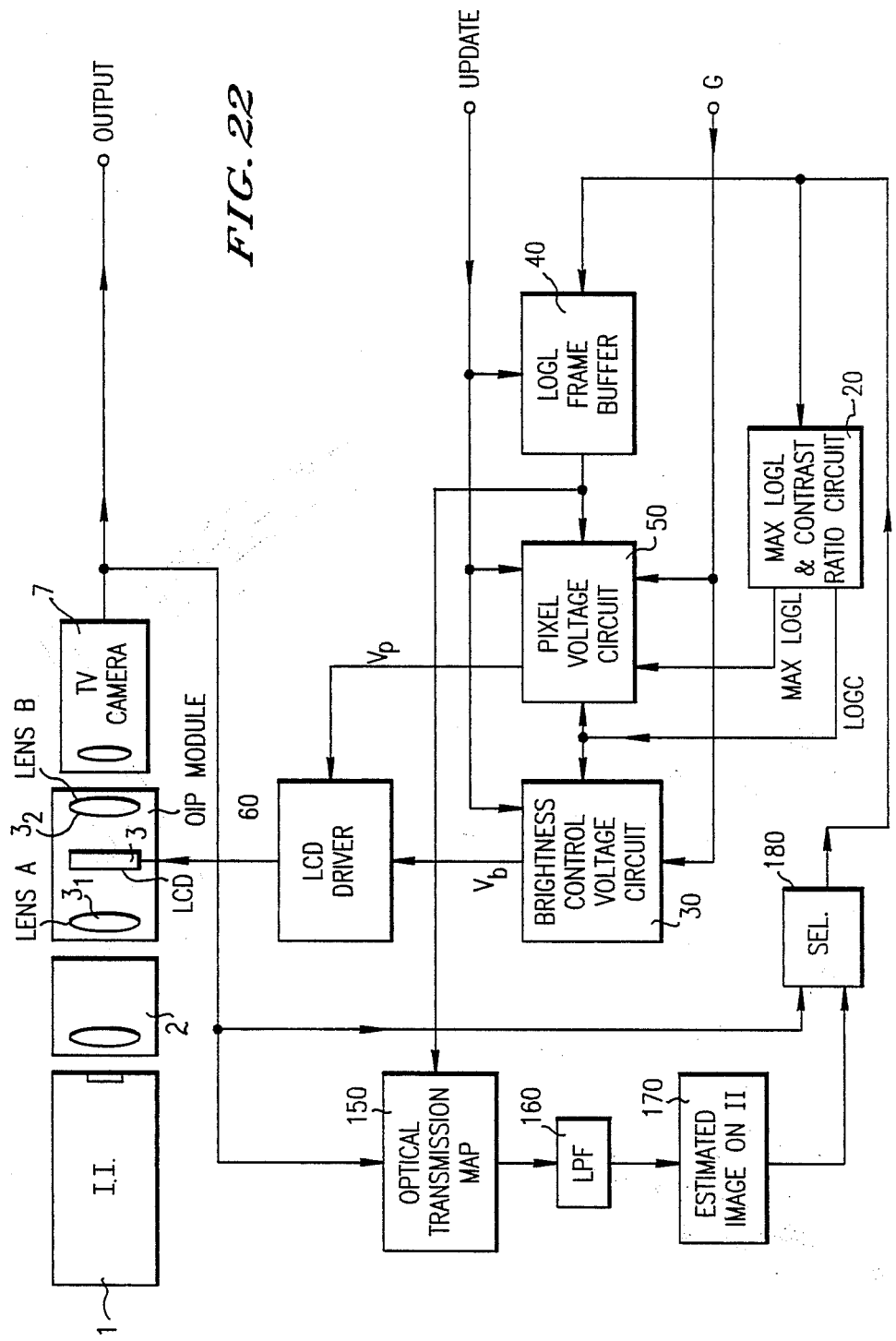

Referring now to FIG. 22, there is shown a sixth embodiment of the invention in which serial images are acquired from the output of the TV camera and subjected to image processing. More particularly, the image which is modulated by the LCD 3 is enhanced at high frequency, because the spatial optical transmission at the LCD reduces the low frequencies by displacement of the LCD from the focal plane of the lens. Therefore, the image on the I.I. can be estimated by using an optical transmission map of the LCD and a low pass filter which depress the effect of the enhanced high frequency.

Figure 23:
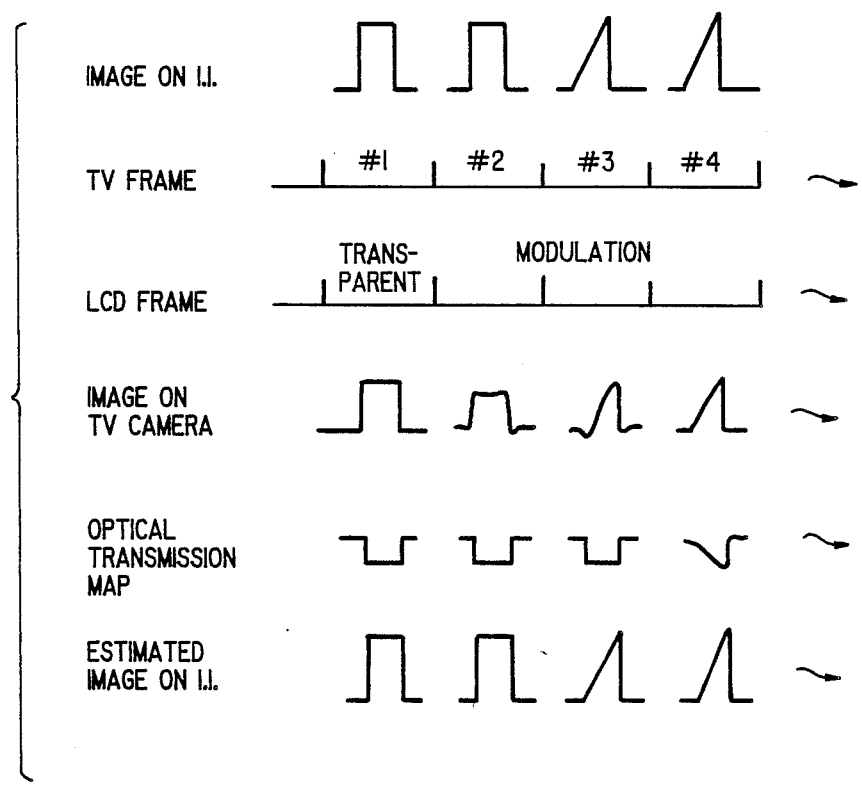

FIG. 23 also shows a timing diagram for the embodiment shown in FIG. 22.

The first image (frame #1) is picked up without modulation of the LCD. This frame is used to control the optical transmission of each LCD element. At frame #2, the image on the I.I. is modulated by the LCD and the dynamic range of the image on the TV camera is reduced. After this frame, the image on the I.I. can not be obtained directly. Therefore, it is necessary to estimate the image on the I.I. in order to control the LCD optical transmission of the next new frame. For this purpose, the optical transmission map (block 150) which indicates the reciprocal fraction of the optical transmission of each LCD element at the current frame is provided.

Briefly elaborating, the optical transmission map 150 stores a table (not shown) by which the simulated pattern of the fraction of the optical transmission (the attenuation rate of the optical level) at the LCD can be determined, and corrects the TV signal level.

In the embodiment shown in FIG. 22, the image on the I.I. output phosphor needs to be estimated. For this purpose, two components are provided. One is the optical transmission map 150, the other is the low pass filter 160.

The optical transmission map 150 corrects the signal level (pixel value) of an image from the TV camera by using the simulated fraction of the optical transmission at the LCD. However, in this map, the enhanced high frequency cannot be corrected.

As noted above, the enhanced high frequency is reduced by the LPF 160.

The actual ratio of the optical transmission of the LCD is controlled by the electrical voltage $V_p$ and $V_b$. Therefore, the fraction of the optical transmission cannot be obtained directly. Therefore, the map 150 needs to be simulated (or reconstructed). A practical way to simulate the map 150 is by deriving a table (above-noted) of the relationship between pixel values of the image in the buffer (block 40) and the actual fraction of the optical transmission of the LCD. This table can be obtained by experiment beforehand and can be derived from FIGS. 12 and 14a or 14b.

Thus, in reconstructing an unmodulated image from the modulated video frame at the TV camera output, the intensity value for each pixel of the modulated TV frame is divided by a respective transmission factor, which by definition is less than one, corresponding to the fraction of optical transmission of that pixel by the LCD. The transmission factor for each pixel in turn is derived from the value of Log L stored in the Log L frame buffer (block 40) and the above-noted table, which for the purposes of this description is considered to be internal to the map 150. More particularly for any pixel of the TV video frame, a transmission factor is determined by addressing the above-noted table with the corresponding (to that pixel) value of Log L stored in the buffer (block 40). Then the intensity or amplitude of that pixel in the TV camera output applied to the map 150 is divided by the so derived transmission factor to simulate what would be the unmodulated intensity of that pixel in the TV video frame.

In FIG. 22, the low pass filter (LPF) 160 reduces the enhanced high frequency in much the same way and for the same reasons as above described in relation to the FIG. 15 embodiment. Thus, the dynamic range of the picked up image at the TV camera is corrected by the optical transmission map 150, and the frequency characteristic is also corrected by the LPF filter 160. The output image of the LPF is the estimated image (block 170) on the I.I. This estimated image is applied to control the LCD of the next frame.

The FIG. 22 embodiment is applicable to the case of a moving subject, because the LCD can be controlled by the estimated image 170 of the previous frame. Selector 180 supplies either the estimated image 170 or the first image frame directly obtained with the TV camera video output signal to blocks 20 and 40, it being understood that the first frame obtained is unmodulated by the LCD 3. Although not shown in FIG. 22, a control signal for the selector operates so as to select either the first (original) TV frame at frame #2 or the estimated image (after low pass filtering) after frame #1. After frame #2, the estimated image on the I.I.' is selected by the selector 180 until the end of acquisition.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical image processing method in a radiographic system in which an image of an object is produced by an image intensifier and converted to video signals by means of a television (TV) camera system, comprising:
    placing a liquid crystal display (LCD) between said image intensifier and said T.V. camera system at a location shifted from a focal plane of said TV camera system, said LCD defining plural pixels which are controllable so that light from said image produced by said image intensifier and impinging on said plural LCD pixels can be selectively attenuated by application of selected control signals to said LCD; and
    generating said control signals selectively based on predetermined parameters of said radiographic system and said image; and
    applying said selectively generated control signals to said LCD to perform selective attenuation and corresponding dynamic range compression of light passing through respective ones of said plural LCD pixels, thereby to perform unsharp masking of said image produced by said image intensifier using said LCD.

2. The method according to claim 1, wherein said TV camera system exhibits a parameter G' defined as the slope of the relationship between a log of a video output signal of the TV camera system and log of a luminance of an input thereto, and said LCD exhibits a parameter G" defined as the slope of the relationship between the log of the luminance of the input to the TV camera system and a log of a luminance at an output of the image intensifier, comprising:
    generating said control signals such that upon application of said control signals to said LCD, the product of G' and G" is within a range of 0.4 to 0.6.

3. The method according to claim 1, wherein said generating step comprises:
    splitting off a portion of said image produced by said image intensifier prior to said LCD;
    evaluating predetermined characteristics of the split-off image; and
    generating said control signals at least in part based on the evaluated characteristics of said split-off image.

4. The method according to claim 1, comprising:
    storing in a memory the control signals generated based on a first image produced by said image intensifier;
    producing a second image on said image intensifier, said second image passing through said LCD to said TV camera system and being converted thereby to a corresponding frame of video signals; and
    reading out the stored control signals stored in said memory and applying said read out control signals to said LCD prior to formation of said, corresponding frame of video signals so that said second image is modulated under the control of the read out control signals.

5. The method according to claim 1, wherein said generating step comprises:
    obtaining a frame of unmodulated video signals from said TV camera system under the condition that the pixels of said LCD have a constant voltage applied thereto so that an optical image from the image intensifier is unmodulated by the LCD;
    evaluating predetermined characteristics of the frame of unmodulated video signals; and
    generating said control signals based at least in part on the predetermined characteristics of said unmodulated video signals evaluated in said evaluating step.

6. The method according to claim 5, further comprising:
    regenerating control signals for successive frames of video signals produced by said TV camera system based on the video signals of said successive frames, wherein the LCD modulates said image from the image intensifier in producing of said successive frames of video signals.

7. The method according to claim 6, wherein said regenerating step comprises:
    reconstructing a successive frame of video signal by determining an inverse of the modulation produced by said LCD on said successive frame and performing a predetermined operation on the video signals of said successive frame based on the determined inverse of said modulation to produce simulated unmodulated video signals corresponding to said successive frame, and
    producing new control signals for a next successive frame based on said simulated unmodulated video signals.

8. The method according to claim 7, wherein said regenerating step further comprises:
    low pass filtering said simulated unmodulated video signals prior to said step of producing new control signals.

9. The method according to claim 7, wherein said reconstructing step comprises:
    determining a respective LCD transmission factor for each pixel of the video signals of said successive frame based on a predetermined function of the intensity of the video signals of a preceding frame and a predetermined relationship of said predetermined function with respect to transmission by said LCD; and dividing an intensity of each pixel of the video signals of said successive frame by said respective transmission function to produce said simulated unmodulated video signals.

10. The method according to claim 8, wherein said reconstructing step comprises:
determining a respective LCD transmission factor for each pixel of the video signals of said successive frame based on a predetermined function of the intensity of the video signals of a preceding frame and a predetermined relationship of said predetermined function with respect to transmission by said LCD; and
dividing an intensity of each pixel of the video signals of said successive frame by said respective transmission function to produce said simulated unmodulated video signals.

11. An optical image processing system in a radiographic system in which an image of an object is produced by an image intensifier and converted to video signals by means of a television (TV) camera system, comprising:
a liquid crystal display (LCD) placed between said image intensifier and said T.V. camera system at a location shifted from a focal plane of said TV camera system, said LCD defining plural pixels which are controllable so that light from said image produced by said image intensifier and impinging on said plural LCD pixels can be selectively attenuated by application of selected control signals to said LCD; and
means for selectively generating said control signals based on predetermined parameters of said radiographic system and said image; and
means for applying said selectively generated control signals to said LCD to perform selective attenuation and corresponding dynamic range compression of light passing through respective LCD pixels, thereby to perform unsharp masking of said image produced by said image intensifier using said LCD.

12. The system according to claim 11, wherein said TV camera system exhibits a parameter G' defined as the slope of the relationship between a log of a video output signal of the TV camera system and a log of a luminance of an input thereto, said LCD exhibits a parameter G" defined as the slope of the relationship between the log of the luminance of the input to the TV camera system and a log of a luminance at an output of said image intensifier, and the product (G'G") of G' and G" is selected within a range of 0.4 to 0.6.

13. The system according to claim 11, wherein said means for selectively generating said control signals comprises:
means for splitting off a portion of the image produced by said image intensifier prior to said LCD;
means for evaluating predetermined characteristics of the split-off image; and
means for generating said control signals at least in part on the evaluated characteristics of said split-off image.

14. The system according to claim 11, comprising:
means for storing the control signals generated based on a first image produced by said image intensifier; wherein after said first image is produced on said image intensifier, a second image is produced on said image intensifier, said second image passing through said LCD to said TV camera system and being converted thereby to a corresponding frame of video signals; and
means for reading out the control signals stored in said memory and applying said read out control signals to said LCD prior to formation of a frame of video signals corresponding to said second image so that said second image is modulated by said LCD under the control of the read out control signals.

15. The system according to claim 11, wherein said means for selectively generating said control signals comprises:
means for obtaining a frame of unmodulated video signals from said TV camera system under the condition that the pixels of said LCD have a constant voltage applied thereto so that an optical image from the image intensifier is unmodulated by the LCD;
means for evaluating predetermined characteristics of the frame of unmodulated video signals; and
said generating means generating said control signals based at least in part on the predetermined characteristics of said unmodulated video signals evaluated in said evaluating means.

16. The system according to claim 15, further comprising:
means for regenerating control signals for successive frames of video signals produced by said TV camera system based on the video signals of said successive frames, wherein the LCD modulates the image from the image intensifier in producing of said successive frames of video signals.

17. The system according to claim 16, wherein said regenerating means comprises:
means for reconstructing a successive frame of video signals by determining an inverse of the modulation produced by said LCD on said successive frame and performing a predetermined operation on the video signals of said successive frame based on the determined inverse of said modulation to produce simulated unmodulated video signals corresponding to said successive frame, and
said generating means producing new control signals for a next successive frame based on said simulated unmodulated video signals.

18. The system according to claim 17, wherein said regenerating means further comprises:
means for low pass filtering said simulated unmodulated video signals prior to said generating means producing said new control signals.

19. The system according to claim 17, wherein said reconstructing means comprises:
means for determining a respective LCD transmission factor for each pixel of the video signals of said successive frame based on a predetermined function of the intensity of the video signals of a preceding frame and a predetermined relationship of said predetermined function with respect to transmission by said LCD; and
means for dividing an intensity of each pixel of the video signals of said successive frame by said respective transmission function to produce said simulated unmodulated video signals.

20. The system according to claim 18, wherein said reconstructing means comprises:
means for determining a respective LCD transmission factor for each pixel of the video signals of said successive frame based on a predetermined function of the intensity of the video signals of a preceding frame and a predetermined relationship of said predetermined function with respect to transmission by said LCD; and means for dividing an intensity of each pixel of the video signals of said successive frame by said respective transmission function to produce said simulated unmodulated video signals.

* * * * *

UNITED STATES PATENT AND TRADEMARK OFFICE
CERTIFICATE OF CORRECTION

PATENT NO. : 4,918,534

DATED : April 17, 1990

INVENTOR(S) : KWOK L. LAM, ET AL

It is certified that error appears in the above-identified patent and that said Letters Patent is hereby corrected as shown below:

In Column 1, after the title of the invention and before "BACKGROUND OF THE INVENTION" insert the following paragraph:

The present invention was made in part with U.S. Government support under grant number 2 R01 CA24806-11 from the Department of Health and Human Services and the National Cancer Institute and grant number HL36238 from the Heart and Lung Institute. The U.S. Government has certain rights in the invention.

Signed and Sealed this

Twenty-sixth Day of November, 1991

Attest:

HARRY F. MANBECK, JR.

*Attesting Officer*  *Commissioner of Patents and Trademarks*